(12) United States Patent
Isomura

(10) Patent No.: US 10,290,094 B2
(45) Date of Patent: May 14, 2019

(54) PATTERN INSPECTION APPARATUS AND PATTERN INSPECTION METHOD

(71) Applicant: NuFlare Technology, Inc., Yokohama-shi (JP)

(72) Inventor: Ikunao Isomura, Yokohama (JP)

(73) Assignee: NuFlare Technology, Inc., Yokohama-shi (JP)

( * ) Notice: Subject to any disclaimer, the term of this patent is extended or adjusted under 35 U.S.C. 154(b) by 183 days.

(21) Appl. No.: 15/596,406

(22) Filed: May 16, 2017

(65) Prior Publication Data

US 2017/0352140 A1 Dec. 7, 2017

(30) Foreign Application Priority Data

Jun. 1, 2016 (JP) ................. 2016-110057

(51) Int. Cl.
*G01N 21/88* (2006.01)
*G06T 7/00* (2017.01)

(52) U.S. Cl.
CPC .... *G06T 7/001* (2013.01); *G06T 2207/30148* (2013.01)

(58) Field of Classification Search
CPC .................. G06T 7/001; G06T 2207/30148
See application file for complete search history.

(56) References Cited

U.S. PATENT DOCUMENTS

| | | | |
|---|---|---|---|
| 7,630,535 B2 | 12/2009 | Isomura | |
| 7,639,863 B2 | 12/2009 | Isomura | |
| 7,664,308 B2 | 2/2010 | Isomura | |
| 2011/0188734 A1* | 8/2011 | Tsuchiya | G06T 7/0002 382/149 |
| 2012/0156596 A1* | 6/2012 | Kominato | G03F 1/58 430/5 |
| 2013/0253688 A1* | 9/2013 | Matsumoto | H01L 21/02675 700/121 |

FOREIGN PATENT DOCUMENTS

| | | |
|---|---|---|
| JP | 2005-37513 | 2/2005 |
| JP | 2007-64842 | 3/2007 |
| JP | 2007-64843 | 3/2007 |
| JP | 2007-88375 | 4/2007 |
| JP | 2011-155119 | 8/2011 |

\* cited by examiner

*Primary Examiner* — Joseph Suh
(74) *Attorney, Agent, or Firm* — Oblon, McClelland, Maier & Neustadt, L.L.P.

(57) ABSTRACT

A pattern inspection apparatus includes a design pattern image generation circuit to generate a first design pattern image by developing an image of the first design pattern, and a second design pattern image by developing an image of the second design pattern for assisting the first design pattern, a comparison circuit to detect a defect candidate by comparing, for each pixel, the measured image with a main reference image which is a predetermined one of the first design pattern image and the second design pattern image, and a determination circuit to determine whether the defect candidate is a defect by using determination conditions obtained using, as a sub reference image, another predetermined one of the first design pattern image and the second design pattern image.

10 Claims, 15 Drawing Sheets

PATTERN INSPECTION APPARATUS AND PATTERN INSPECTION METHOD

CROSS-REFERENCE TO RELATED APPLICATION

This application is based upon and claims the benefit of priority from the prior Japanese Patent Application No. 2016-110057 filed on Jun. 1, 2016 in Japan, the entire contents of which are incorporated herein by reference.

BACKGROUND OF THE INVENTION

Field of the Invention

Embodiments of the present invention relate generally to a pattern inspection apparatus and a pattern inspection method. More specifically, for example, embodiments of the present invention relate to an inspection apparatus which inspects a pattern formed on a mask substrate with a mask pattern, or a pattern formed on a semiconductor substrate onto which the mask pattern has been transferred from the mask substrate.

Description of Related Art

In recent years, with the advance of high integration and large capacity of large-scale integration (LSI) circuits, the line width (critical dimension) required for circuits of semiconductor elements is becoming progressively narrower. Such semiconductor elements are manufactured by circuit formation of exposing and transferring a pattern onto a semiconductor substrate (wafer) by means of a reduced projection exposure apparatus known as a stepper while using an original or "master" pattern (also called a mask or a reticle, hereinafter generically referred to as a mask substrate) with a circuit pattern formed thereon.

Even though a mask pattern formed on the mask substrate is exposure-transferred onto the semiconductor substrate, the transferred pattern deviates from the mask pattern due to exposure conditions, influence of the proximity effect, and the like. To solve this problem, a method has been widely used where auxiliary patterns such as an OPC (Optical Proximity Correction) pattern in consideration of deviation in advance, and an SRAF (sub resolution assist features) pattern formed with a size below the resolution limit are additionally arranged in a pattern layout (design pattern) to be transferred onto the semiconductor substrate so that a pattern with auxiliary patterns may be formed on the mask substrate.

Meanwhile, the LSI manufacturing requires a tremendous amount of manufacturing cost, therefore it is crucial to improve its yield. The scale of patterns configuring an LSI is in transition from on the order of submicrons to nanometers. Therefore, the pattern inspection apparatus for inspecting defects of mask patterns formed on a mask substrate needs to be highly accurate. Also, the pattern inspection apparatus for inspecting defects of transferred patterns formed on a semiconductor substrate similarly needs to be highly accurate.

As an inspection method, there is known a method (die-to-database inspection method) of comparing an optical image obtained by imaging, at a predetermined magnification, a pattern formed on a substrate, such as a lithography mask, a wafer and the like, by using a magnification optical system with a design image obtained from design data being a basis for the optical image. According to this inspection method employed in the inspection apparatus, after performing alignment between the images, they are compared in accordance with an appropriate algorithm, and if the compared images are not identical, it is determined that there is a pattern defect.

The pattern inspection apparatus described above acquires an optical image by irradiating a pattern on the substrate with a laser beam in order to capture its transmission image or reflection image. Meanwhile, there has been developed an inspection apparatus which acquires a pattern image by irradiating a substrate with a single electron beam or multi-beams composed of a plurality of electron beams in order to detect a secondary electron, corresponding to each beam, emitted from the substrate (e.g., refer to Japanese Patent Application Laid-open (JP-A) No. 2011-155119). For example, in a pattern inspection apparatus using multi-beams, a secondary electron image obtained using the entire multi-beams is compared with a reference image.

Regarding a mask substrate, a mask pattern has been formed thereon based on a design pattern also including auxiliary patterns described above. Therefore, in the case of inspecting the mask substrate, it can be thought to be effective to perform inspection based on a design pattern also including auxiliary patterns. Since such an auxiliary pattern is only for assisting eventually forming a pattern in accordance with an original design pattern on the semiconductor substrate, even if the shape of the auxiliary pattern itself deviates somewhat, it is sometimes possible to use the mask substrate as it is. However, in the inspection apparatus, there has been a problem in that since a reference image is formed based on design pattern also including auxiliary patterns and shape comparison is performed with high precision, a portion which does not need to be regarded as a defect, such as explained above, is also detected as a defect. Conversely, if the mask substrate is inspected based on an original design pattern not including auxiliary patterns, the portion in which an auxiliary pattern is formed not to be defective naturally is also determined to be a defect. This problem is common to both the cases of irradiating a pattern on the mask substrate with a laser beam in order to acquire/capture the pattern's transmission image or reflection image, and of irradiating it with an electron beam in order to acquire/capture a secondary electron image.

On the other hand, regarding a semiconductor substrate, a pattern close to an original design pattern not including auxiliary patterns is supposed to have been formed thereon. Therefore, in the case of inspecting the semiconductor substrate, it can be thought to be effective to perform inspection based on the original design pattern not including auxiliary patterns. In inspecting the semiconductor substrate and in highly accurately inspecting a pattern with a size below the resolution limit of a laser beam serving as an inspection light, electron beams are used. However, actually, a mask pattern in which multiple auxiliary patterns are arranged is exposure-transferred onto the semiconductor substrate, and thus, the shape of the exposure pattern formed on the semiconductor substrate deviates from the original design pattern. However, as long as no disconnection or short circuit occurs, it is sometimes possible to use the semiconductor substrate as it is in circuit design. However, in the inspection apparatus, there has been a problem in that since a reference image is formed based on an original design pattern not including auxiliary patterns and shape comparison is performed with high precision, a portion which does not need to be regarded as a defect, such as explained above, is also detected as a defect. Conversely, if the semiconductor substrate is inspected based on a design pattern also including auxiliary patterns, the portion where the auxiliary pattern is formed is naturally determined to be defective though it is not a defect. This problem is common to both the cases of irradiating a pattern on the semiconductor substrate with a laser beam in order to acquire/capture the pattern's reflection image, and of irradiating it with an electron beam in order to acquire/capture a secondary electron image.

BRIEF SUMMARY OF THE INVENTION

According to one aspect of the present invention, a pattern inspection apparatus includes a measured image acquisition mechanism configured to acquire a measured image of a pattern formed on an inspection substrate, by using one of an electron beam and a laser beam, a storage device configured to store first design pattern data defining a first design pattern, and second design pattern data defining a second design pattern obtained by adding an auxiliary pattern for assisting the first design pattern to the first design pattern, a design pattern image generation circuit configured to generate a first design pattern image which is defined by pixel data obtained by developing an image of the first design pattern, and a second design pattern image which is defined by pixel data obtained by developing an image of the second design pattern, a comparison circuit configured to detect a defect candidate by comparing, for each pixel, the measured image with a main reference image which is a predetermined one of the first design pattern image and the second design pattern image, and a determination circuit configured to determine whether the defect candidate is a defect by using determination conditions obtained using, as a sub reference image, another predetermined one of the first design pattern image and the second design pattern image.

According to another aspect of the present invention, a pattern inspection method includes acquiring a measured image of a pattern formed on an inspection substrate, by using one of an electron beam and a laser beam, storing first design pattern data defining a first design pattern, and second design pattern data defining a second design pattern obtained by adding an auxiliary pattern for assisting the first design pattern to the first design pattern, generating a first design pattern image which is defined by pixel data obtained by developing an image of the first design pattern, generating a second design pattern image which is defined by pixel data obtained by developing an image of the second design pattern, detecting a defect candidate by comparing, for each pixel, the measured image with a main reference image which is a predetermined one of the first design pattern image and the second design pattern image, and determining whether the defect candidate is a defect by using determination conditions obtained using, as a sub reference image, another predetermined one of the first design pattern image and the second design pattern image.

DETAILED DESCRIPTION OF THE INVENTION

The embodiments below describe a pattern inspection apparatus and method which can reduce detecting, as a defect, a portion which does not need to be regarded as being defective.

Moreover, the embodiments below describe a case where, as an example of a method for capturing an image (acquiring a measured image) of a pattern formed on an inspection substrate, the inspection substrate is irradiated with multiple electron beams in order to capture a secondary electron image. However, it is not limited thereto. It is also preferable, as a method for capturing an image of a pattern formed on the inspection substrate, to irradiate the inspection substrate with a single electron beam in order to capture a secondary electron image (acquire a measured image). Alternatively, it is also preferable to irradiate the inspection substrate with a laser beam in order to capture its transmission image or reflection image is also preferable.

First Embodiment

Figure 1:
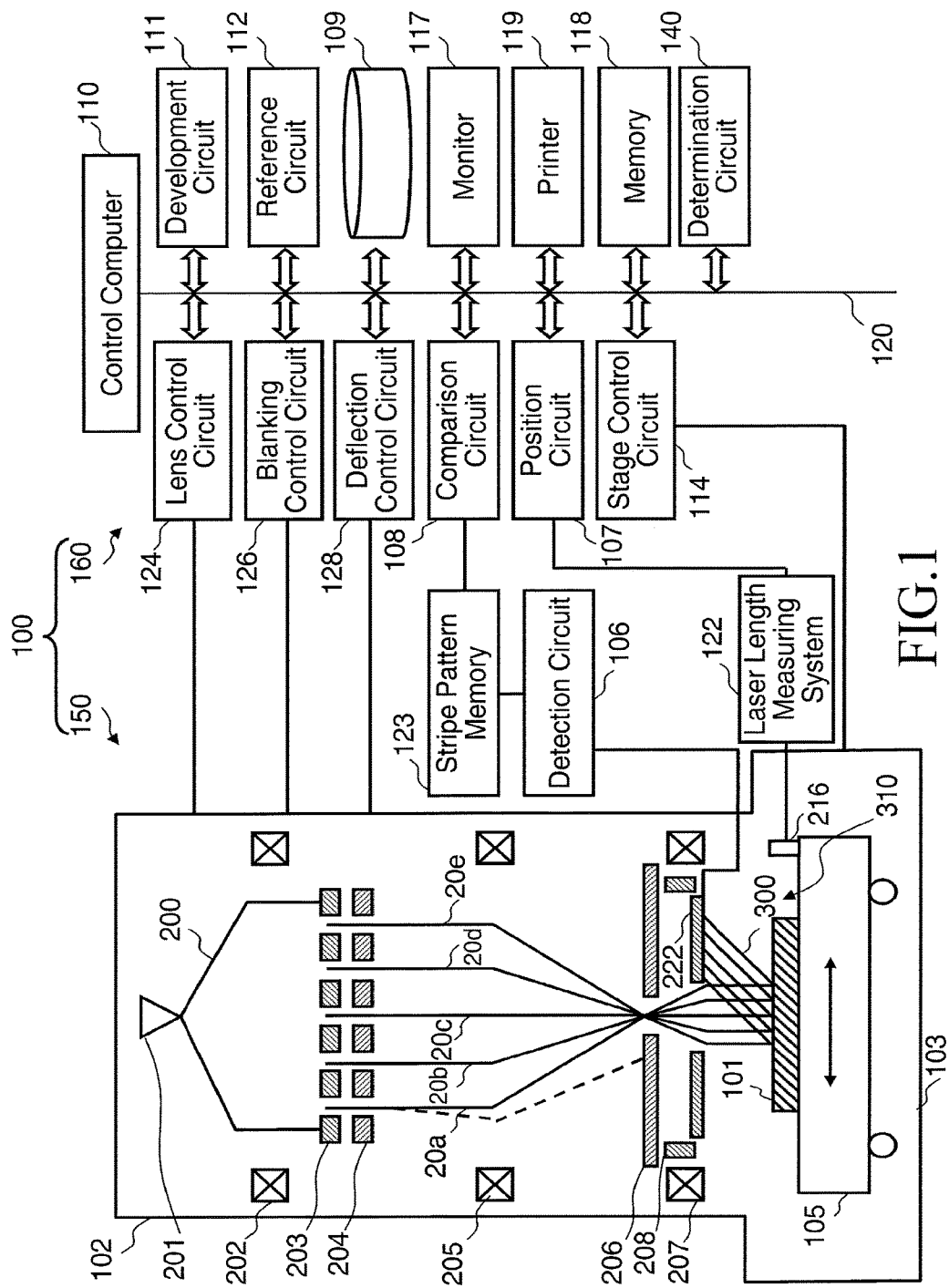
FIG. 1 shows a configuration of a pattern inspection apparatus according to a first embodiment.

FIG. 1 shows a configuration of a pattern inspection apparatus according to a first embodiment. In FIG. 1, an inspection apparatus 100 for inspecting patterns formed on the substrate is an example of a multi electron beam inspection apparatus or a pattern inspection apparatus. The inspection apparatus 100 includes a measured image acquisition unit 150 and a control system circuit 160 (control circuit). The measured image acquisition unit 150 includes an electron beam column 102 (electron optical column), an inspection chamber 103, a detection circuit 106, a stripe pattern memory 123, and a laser length measurement system 122. In the electron beam column 102, there are arranged an electron gun 201, an illumination lens 202, a shaping aperture array substrate 203, a blanking aperture array mechanism 204, a reducing lens 205, a limiting aperture substrate 206, an objective lens 207, a deflector 208, and a detector 222.

In the inspection chamber 103, there is arranged an XY stage 105 which is movable at least in the x-y directions. On the XY stage 105, there is placed a substrate 101 on which a plurality of figure patterns to be inspected are formed. The substrate 101 may be an exposure mask substrate or a semiconductor substrate such as a silicon wafer as described above. The substrate 101 is placed, on the XY stage 105, with its pattern forming surface facing upward, for example. On the XY stage 105, there is arranged a mirror 216 which reflects a laser beam for measuring a laser length emitted from the laser length measurement system 122 arranged outside the inspection chamber 103. The detector 222 is connected, at the outside of the electron beam column 102, to the detection circuit 106. The detection circuit 106 is connected to the stripe pattern memory 123.

In the control system circuit 160, a control computer 110 is connected, through a bus 120, to a position circuit 107, a comparison circuit 108, a development circuit 111, a reference circuit 112, a stage control circuit 114, a lens control circuit 124, a blanking control circuit 126, a deflection control circuit 128, a determination circuit 140, a storage device 109 such as a magnetic disk drive, etc., a monitor 117, a memory 118, and a printer 119. The stripe pattern memory 123 is connected to the comparison circuit 108. The XY stage 105 is driven by the stage control circuit 114 under the control of the control computer 110. The XY stage 105 can be moved by a drive system such as a three-axis (X, Y, and θ) motor, which drives the stage in the directions of x, y, and θ. For example, a step motor can be used as each of these X, Y, and θ motors (not shown). The XY stage 105 is movable in the horizontal direction and the rotation direction by the motors of the X-axis, Y-axis, and θ-axis. The movement position of the XY stage 105 is measured by the laser length measurement system 122, and supplied (transmitted) to the position circuit 107. The laser length measurement system 122 measures the position (length) of the XY stage 105 by receiving a catoptric light from the mirror 216, based on the principle of laser interferometry.

A high voltage power supply circuit (not shown) is connected to the electron gun 201. The high voltage power supply circuit applies an acceleration voltage to between the cathode and the anode (not shown) in the electron gun 201. In addition to this applied acceleration voltage, by applying a predetermined bias voltage, and heating the cathode at a predetermined temperature, electrons emitted from the cathode are accelerated to become electron beams which are to be emitted. For example, electron lenses are used as the illumination lens 202, the reducing lens 205, and the objective lens 207, and all of them are controlled by the lens control circuit 124. In the blanking aperture array mechanism 204, a plurality of individual blanking mechanisms are arranged as to be described later, and a control signal to each individual blanking mechanism is output from the blanking control circuit 126. The deflector 208 is configured by at least four electrodes, and controlled by the deflection control circuit 128.

In the case where the substrate 101 is an exposure mask substrate, auxiliary patterns such as an OPC (Optical Proximity Correction) pattern in consideration of deviation in advance, and an SRAF (sub resolution assist features) pattern formed with a size below the resolution limit are additionally arranged in a layout pattern (which is a first design pattern: design pattern without auxiliary patterns: Pre-OPC pattern) composed of a plurality of figure patterns to be transferred onto the semiconductor substrate, and then, the pattern added with the auxiliary patterns (which is a second design pattern: design pattern with auxiliary patterns: Post-OPC pattern) is written on the substrate 101, coated with resist, by a writing apparatus (not shown) such as an electron beam writing apparatus, and is formed through each step such as developing, ashing, and etching. Therefore, the pattern close to the design pattern (second design pattern: design pattern with auxiliary patterns) also including auxiliary patterns is formed on the mask substrate.

On the other hand, in the case where the substrate 101 is a semiconductor substrate, a mask pattern formed on the mask substrate based on a design pattern with auxiliary patterns is transferred by an exposure apparatus (stepper) (not shown) onto the substrate 101 coated with resist, and is formed through each step such as developing, ashing, and etching. Then, a pattern close to the original layout pattern (first design pattern: design pattern without auxiliary patterns) not including auxiliary patterns by the influence of a proximity effect and the like is formed on the semiconductor substrate.

According to the first embodiment, data (first design pattern data) of design pattern without auxiliary patterns, which defines an original layout pattern (first design pattern: design pattern without auxiliary patterns) not including auxiliary patterns, and data (second design pattern data) of design pattern with auxiliary patterns, which defines a design pattern (second design pattern: design pattern with auxiliary patterns) obtained by adding auxiliary patterns for assisting the original layout pattern to the original layout pattern, are input from the outside of the inspection apparatus 100, and stored in the storage device 109. Both the data of a design pattern without auxiliary patterns, and the data of a design pattern with auxiliary patterns are defined not by pixel data (gray scale value of each pixel) but by vector data, for example. Each figure of a plurality of figure patterns is defined by a figure code, coordinates (x, y), size, and the like of the figure concerned, for example.

FIG. 1 shows configuration elements necessary for describing the first embodiment. It should be understood that other configuration elements generally necessary for the writing apparatus 100 may also be included therein.

Figure 2:
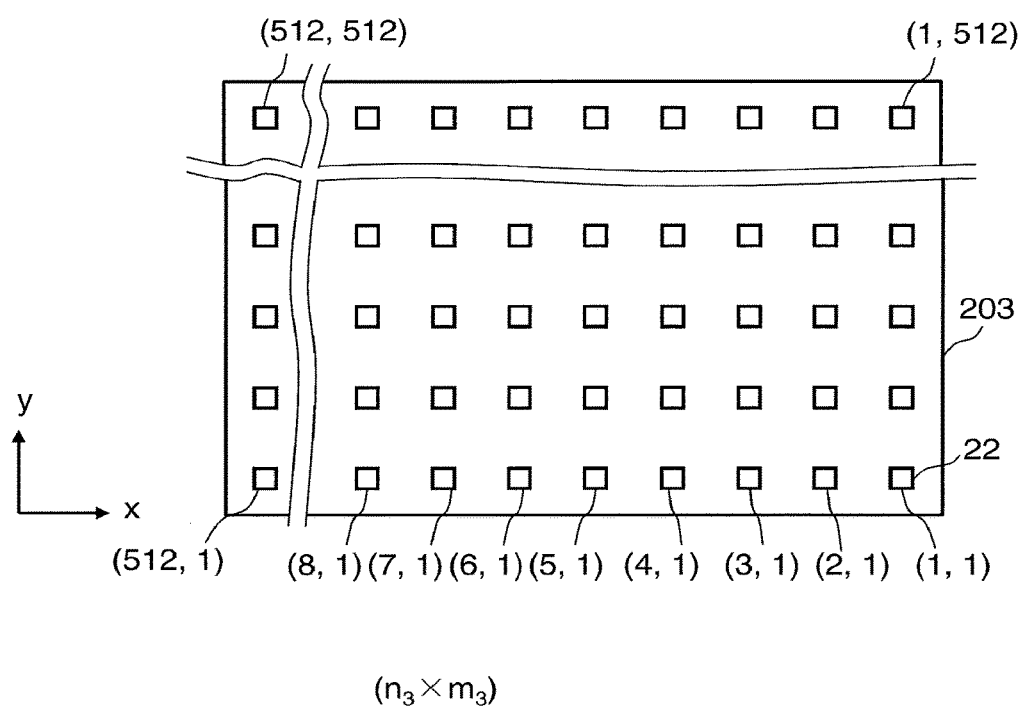
FIG. 2 is a conceptual diagram showing a structure of a shaping aperture array substrate according to the first embodiment.

FIG. 2 is a conceptual diagram showing a structure of a shaping aperture array substrate according to the first embodiment. As shown in FIG. 2, holes (openings) 22 of $n_3$ columns wide (x direction) and $m_3$ rows long (y direction) are two-dimensionally formed, like a matrix, at a predetermined arrangement pitch in the shaping aperture array substrate 203, where one of $n_3$ and $m_3$ is an integer of 1 or more, and the other is an integer of 2 or more. In FIG. 2, for example, holes 22 of 512 (columns arrayed in x direction)× 512 (rows arrayed in y direction) are formed. Each of the holes 22 is a quadrangle having the same dimension, shape, and size. Alternatively, each of the holes 22 may be a circle with the same outer diameter. Multi-beams 20 are formed by letting portions of an electron beam 200 individually pass through a corresponding hole of a plurality of holes 22. Here, the case in which the holes 22 of two or more rows and columns are arranged in both the x and y directions is shown, but the arrangement is not limited thereto. For example, it is also acceptable that a plurality of holes 22 are arranged in only one row (x direction) or in only one column (y direction). That is, in the case of only one row, a plurality of holes 22 are arranged in the x direction as a plurality of columns, and in the case of only one column, a plurality of holes 22 are arranged in the y direction as a plurality of rows. The method of arranging the holes 22 is not limited to the case of FIG. 2 where holes are arranged like a grid in the width and length directions. For example, with respect to the k-th and the (k+1)th rows arrayed in the length direction (y direction), each hole in the k-th row and each hole in the (k+1)th row may be mutually displaced in the width direction (x direction) by a dimension "a". Similarly, with respect to the (k+1)th and the (k+2)th rows arrayed in the length direction (y direction), each hole in the (k+1)th row and each hole in the (k+2)th row may be mutually displaced in the width direction (x direction) by a dimension "b".

Figure 3:
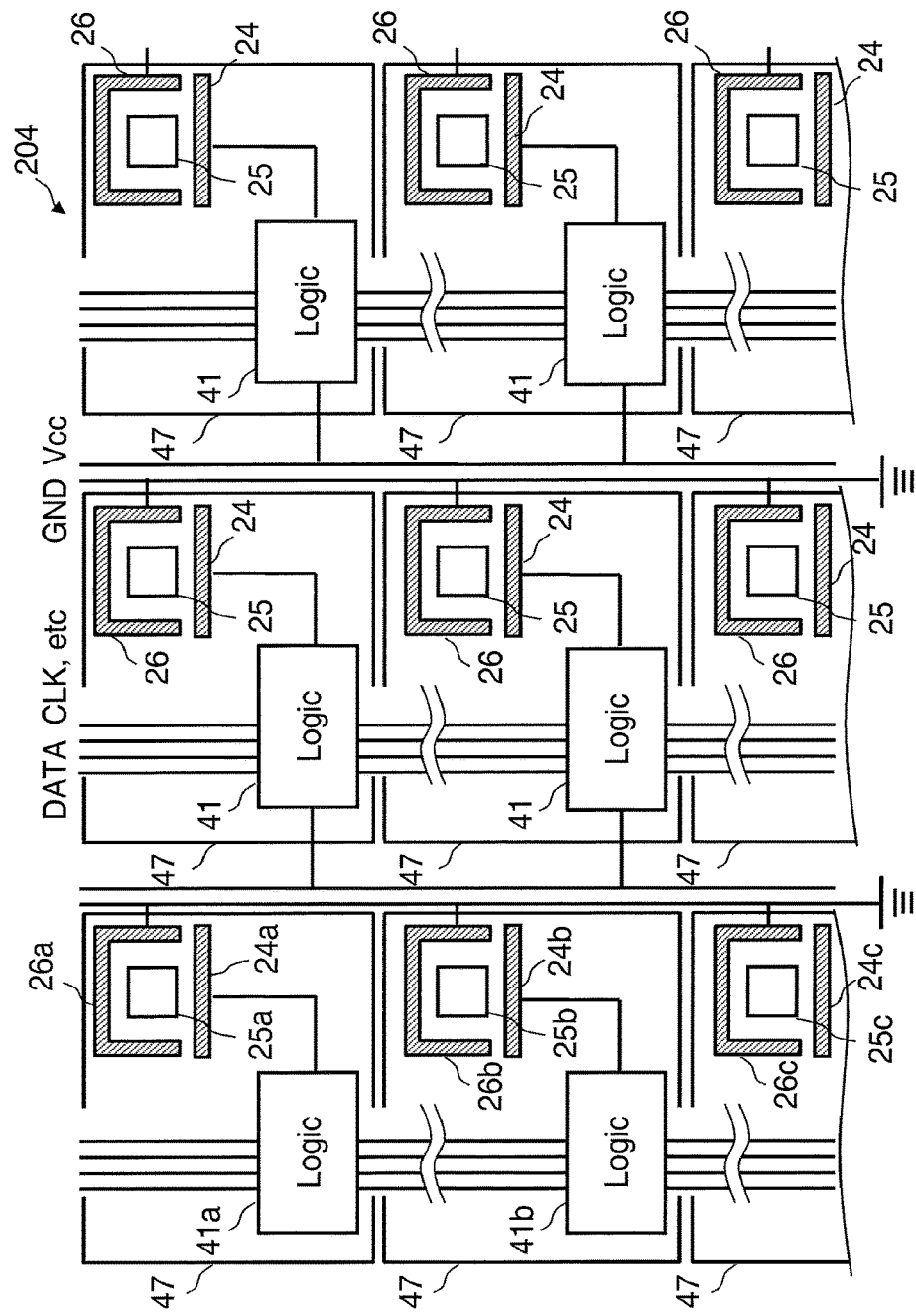
FIG. 3 is a top view conceptual diagram showing a part of a blanking aperture array mechanism according to the first embodiment.

FIG. 3 is a top view conceptual diagram showing a part of a blanking aperture array mechanism according to the first embodiment. In FIG. 3, the positional relation of electrodes 24 and 26, and that of a control circuit 41 are not in accordance with each other. As shown in FIG. 3, in the substrate of the blanking aperture array mechanism 204, there are formed passage holes 25 (openings), through which multiple beams individually pass, at the positions each corresponding to each hole 22 of the shaping aperture array substrate 203 of FIG. 2. Then, on the substrate of the blanking aperture array mechanism 204, a pair of electrodes 24 and 26 (blanker: blanking deflector) for blanking deflection is arranged close to a corresponding one of a plurality of passage holes 25 in a manner such that the electrodes 24 and 26 are opposite each other across the passage hole 25 concerned. Moreover, close to each passage hole 25, the control circuit 41 (logic circuit) for applying a deflection voltage to, for example, the electrode 24 for each passage hole 25 is arranged in a manner being embedded in the substrate of the blanking aperture array mechanism 204. The other one (the electrode 26, for example) of the two electrodes 24 and 26 for each beam is grounded (earthed). Further, a 10 bit line for control signal is connected to each control circuit 41. In addition to the n-bit (e.g., 10 bit) line, for example, a clock signal line, a power source line, and the like are connected to each control circuit 41. An individual blanking mechanism 47 composed of the electrodes 24 and 26 and the control circuit 41 is configured for each beam of multi-beams. A control signal for each control circuit 41 is output from the blanking control circuit 126. Moreover, a shift register (not shown) is arranged in each control circuit 41, and for example, shift registers in the control circuits for beams in one row of $n_3 \times m_3$ multi-beams are connected in series. For example, control signals for beams in one row of $n_3 \times m_3$ multi-beams are transmitted in series. For example, a control signal for each beam is stored in a corresponding control circuit 41 by $n_3$ clock signals.

The electron beam 20 passing through a corresponding passage hole is independently deflected by a voltage applied to the two electrodes 24 and 26 being a pair. Blanking control is performed by this deflection. Blanking deflection is provided for each corresponding beam of multi-beams. Thus, each of a plurality of blankers performs blanking deflection of a corresponding one of multi-beams having passed through a plurality of holes 22 (openings) of the shaping aperture array substrate 203.

Next, operations of the measured image acquisition unit 150 in the inspection apparatus 100 will be described. The electron beam 200 emitted from the electron gun 201 (emission source) almost perpendicularly (e.g., vertically) illuminates the whole of the shaping aperture array substrate 203 by the illumination lens 202. A plurality of quadrangular holes (openings) are formed in the shaping aperture array substrate 203. The region including all the plurality of holes is irradiated with the electron beam 200. For example, a plurality of quadrangular electron beams (multi-beams) 20a to 20e are formed by letting portions of the electron beam 200, which irradiates the positions of a plurality of holes 22, individually pass through a corresponding hole of the plurality of holes of the shaping aperture array substrate 203. The multi-beams 20a to 20e individually pass through corresponding blankers (first deflector: individual blanking mechanism) of the blanking aperture array mechanism 204. Each blanker deflects (provides blanking deflection) the electron beam 20 which is individually passing.

The multi-beams 20a to 20e having passed through the blanking aperture array mechanism 204 are reduced by the reducing lens 205, and go toward the hole in the center of the limiting aperture substrate 206. At this stage, the electron beam 20 which was deflected by the blanker of the blanking aperture array mechanism 204 deviates (shifts) from the hole in the center of the limiting aperture substrate 206 and is blocked by the limiting aperture substrate 206. On the other hand, the electron beam 20 which was not deflected by the blanker of the blanking aperture array mechanism 204 passes through the hole in the center of the limiting aperture substrate 206 as shown in FIG. 1. Blanking control is provided by ON/OFF of the individual blanking mechanism so as to control ON/OFF of beams. Thus, the limiting aperture substrate 206 blocks each beam which was deflected to be in the OFF state by the individual blanking mechanism. Then, for each beam, one shot beam is formed by a beam which has been made during a period from becoming beam ON to becoming beam OFF and has passed through the limiting aperture substrate 206. The multi-beams 20 having passed through the limiting aperture substrate 206 are focused by the objective lens 207 so as to be a pattern image of a desired reduction ratio. Then, respective beams (the whole of the multi-beams 20) having passed through the limiting aperture substrate 206 are collectively deflected in the same direction by the deflector 208 in order to irradiate respective beam irradiation positions on the substrate 101. Ideally, the multi-beams 20 irradiating at a time are aligned at pitches obtained by multiplying the arrangement pitch of a plurality of holes of the shaping aperture array substrate 203 by a desired reduction ratio described above. Thus, the electron beam column 102 irradiates the substrate 101 with two-dimensional $n_3 \times m_3$ multi-beams 20 at a time. A secondary electron 300 including a reflected electron corresponding to each beam of the multi-beams 20, emitted from the substrate 101 because the multi-beams 20 irradiate desired positions of the substrate 101, are detected when being incident to a detector 222.

Figure 4:
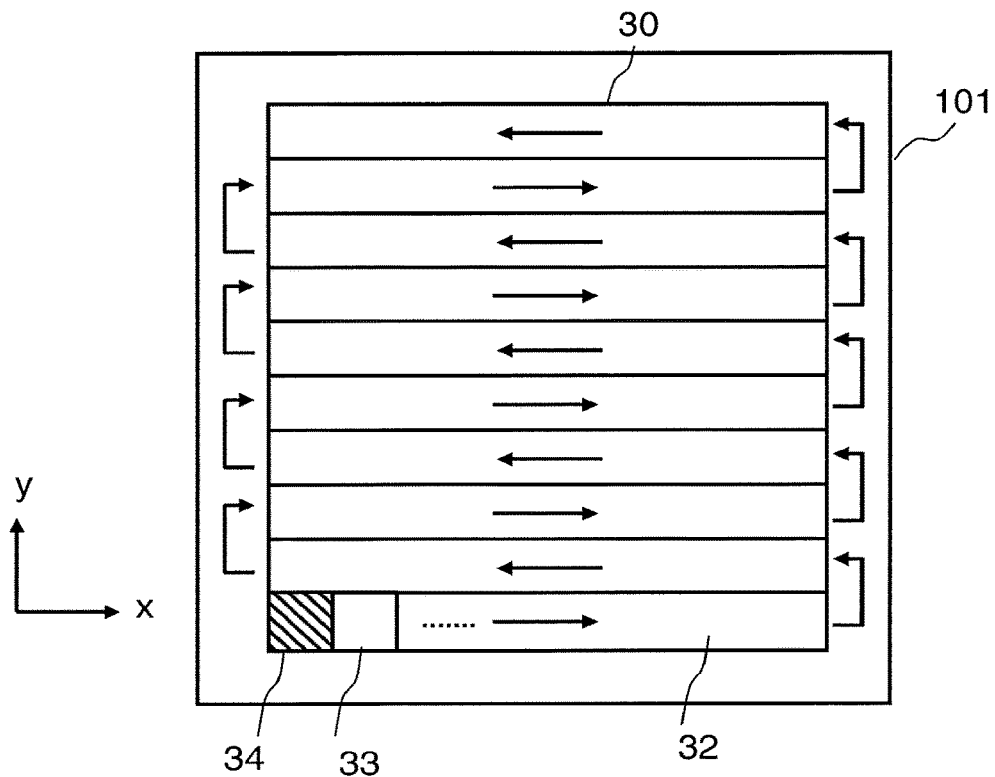
FIG. 4 illustrates an inspection region of a mask substrate and an inspection operation according to the first embodiment.

FIG. 4 illustrates an inspection region of a mask substrate and an inspection operation according to the first embodiment. FIG. 4 shows the case of the inspection substrate 101 being a mask substrate. In FIG. 4, for example, an inspection region 30 of the substrate 101 is virtually divided into a plurality of strip-shaped stripe regions 32 by a predetermined width in the y direction. For example, the inspection region 30 is virtually divided into a plurality of strip-shaped stripe regions 32 by a width equal to a natural multiple (or "natural number multiple") of the width of an irradiation region 34 which can be irradiated with one shot of the entire multi-beams 20. In the case of FIG. 4, the inspection region 30 is virtually divided into a plurality of strip-shaped stripe regions 32 by the same width as that of the irradiation region 34.

Figure 5:
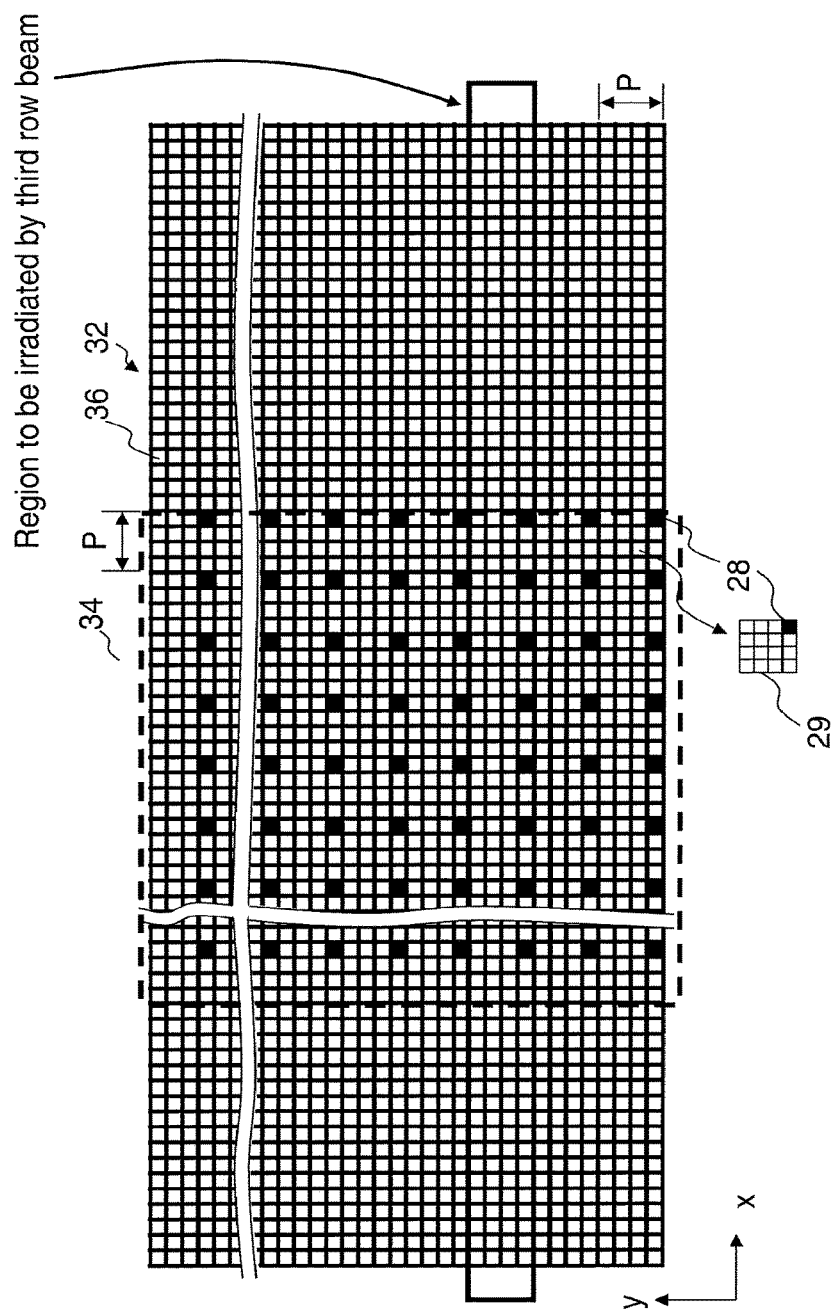
FIG. 5 shows an example of an irradiation region of multi-beams and a measurement pixel according to the first embodiment.

FIG. 5 shows an example of an irradiation region of multi-beams and a measurement pixel according to the first embodiment. In FIG. 5, each stripe region 32 is divided into a plurality of mesh regions by the beam size of the multi-beams, for example. Each mesh region serves as a measurement pixel 36 (unit irradiation region). FIG. 5 shows the case of multi-beams of 8×8 (rows by columns). In the irradiation region 34, there are shown a plurality of measurement pixels 28 (irradiation positions of beams of one shot) which can be irradiated with one irradiation of the multi-beams 20. In other words, the pitch between adjacent measurement pixels 28 is the pitch between beams of the multi-beams. In the example of FIG. 5, one grid 29 is a square region surrounded at four corners by four adjacent measurement pixels 28, and including one of the four measurement pixels 28. In the case of FIG. 5, each grid 29 is composed of 4×4 pixels.

Figure 6:
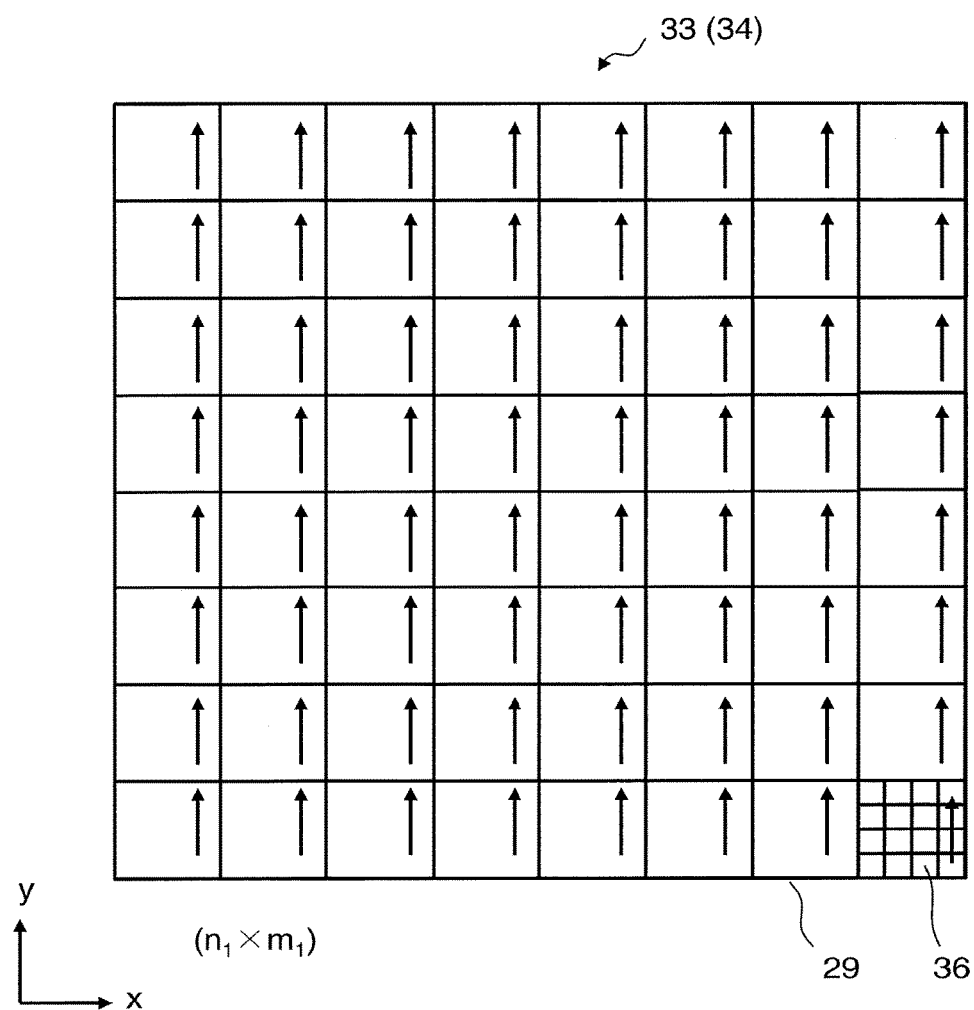
FIG. 6 is a conceptual diagram describing an example of details of a scanning operation according to the first embodiment.

FIG. 6 is a conceptual diagram describing an example of details of a scanning operation according to the first embodiment. Each stripe region 32 is scanned for each unit inspection region 33 having the same size as the irradiation region 34, for example. FIG. 6 shows an example of scanning a certain unit inspection region 33. In one irradiation region 34, there are arranged $n_1 \times m_1$ grids 29 in the x and y directions (two-dimensionally). When all the n×m multi-beams 20 are used, $n_1 \times m_1$ grids 29 indicate n×m grids 29. When the XY stage 105 is moved to a position where one unit inspection region 33 can be irradiated with the multi-beams 20, the XY stage 105 is stopped at the position, and then, the inside of the unit inspection region 33 concerned is scanned while regarding the unit inspection region 33 concerned as the irradiation region 34. Each beam of the multi-beams 20 takes charge of one grid 29 different from others. At the time of each shot, each beam irradiates one measurement pixel 28 equivalent to the same position in the grid 29 concerned. In the case of FIG. 6, the first shot of each beam irradiates the first measurement pixel 36 from the right in the bottom row in the grid 29 concerned. Then, the deflector 208 shifts the beam deflection position in the y direction by one measurement pixel 36 by collectively deflecting the entire multi-beams 20, and the second shot irradiates the first measurement pixel 36 from the right in the second row from the bottom in the grid 29 concerned. Similarly, the third shot irradiates the first measurement pixel 36 from the right in the third row from the bottom in the grid 29 concerned. The fourth shot irradiates the first measurement pixel 36 from the right in the fourth row from the bottom in the grid 29 concerned. Next, the deflector 208 shifts the beam deflection position to the position of the second measurement pixel 36 from the right in the bottom row by collectively deflecting the entire multi-beams 20, and the measurement pixel 36 is similarly irradiated in order in the y direction. By repeating this operation, all the measurement pixels 36 in one grid 29 are irradiated in order with one beam. In a one-time shot, the secondary electrons 300 corresponding to a plurality of shots whose maximum number is the same as the number of a plurality of holes 22 are detected at a time by the multi-beams formed by passing through the plurality of holes 22 of the shaping aperture array substrate 203.

As described above, the entire multi-beams 20 scans the unit inspection region 33 as the irradiation region 34, and that is, each beam individually scans one corresponding grid 29. In a state where the XY stage 105 remains stopped, after scanning one unit inspection region 33 is completed, the irradiation region 34 moves to a next adjacent unit inspection region 33 by the step operation in order to scan the next adjacent unit inspection region 33 while the XY stage 105 remains stopped. Thus, the "step and repeat" operation is repeated to proceed scanning each stripe region 32. Due to shots of multi-beams, the secondary electrons 300 are emitted from the irradiated measurement pixels 36 at each time of the shot so as to be detected by the detector 222. According to the first embodiment, the detector 222 detects the secondary electron 300 emitted upward from each measurement pixel 36, for each measurement pixel 36 (or each grid 29) which is a unit detection region of the detector 222.

By performing scanning using the multi-beams 20 as described above, the scanning operation (measurement) can be performed at a higher speed than scanning by a single beam. Although the case of scanning each unit inspection region 33 by the "step and repeat" operation has been described in the above example, it is not limited thereto. Scanning each unit inspection region 33 may be performed by continuously moving the XY stage 105.

Figure 7:
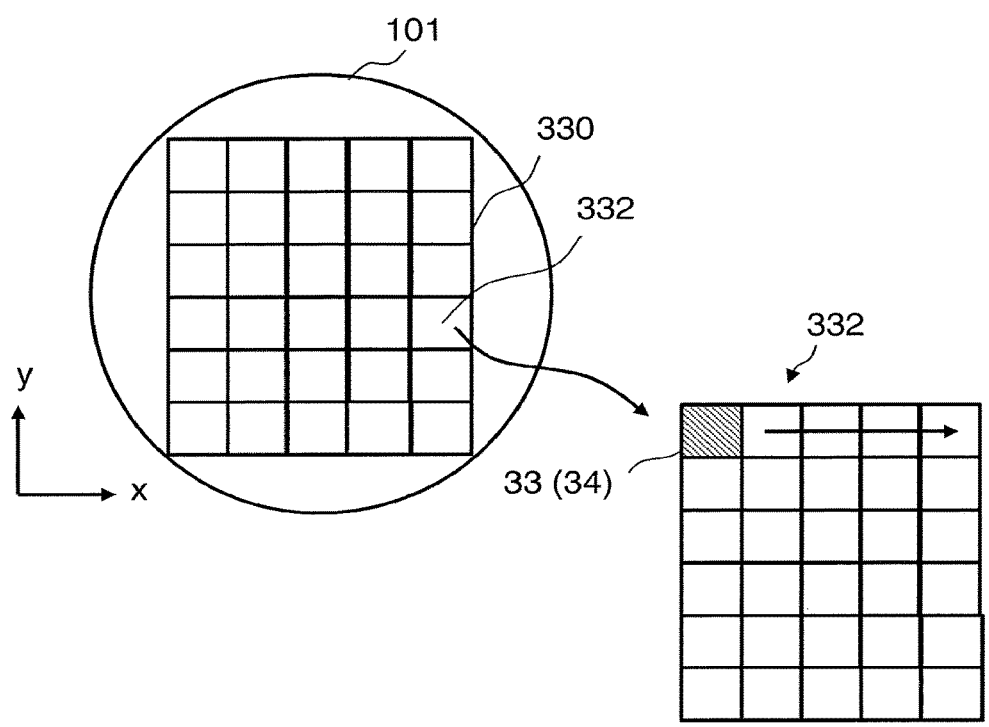
FIG. 7 shows an example of a plurality of chip regions formed on a semiconductor substrate according to the first embodiment.

FIG. 7 shows an example of a plurality of chip regions formed on a semiconductor substrate according to the first embodiment. FIG. 7 shows the case where the substrate 101 to be inspected is a semiconductor substrate. In FIG. 7, a plurality of chips (dies) 332 in a two-dimensional array are formed in the inspection region 330 of the substrate 101. A mask pattern for one layer formed on the mask substrate described above has been reduced to ¼, for example, and transferred onto each chip 332 by an exposure device (stepper) (not shown). The inside of each chip 332 is divided into, for example, $n_2 \times m_2$ unit inspection regions 33, extending in the length and width directions, each having the same size as the irradiation region 34. Then, scanning is performed for each unit inspection region 33. The method of scanning may be the same as that described with reference to FIGS. 5 and 6. Although FIG. 7 illustrates the case where the semiconductor substrate on which a plurality of chips (dies) 332 belonging to the same mask pattern are formed in an array is used as the inspection substrate 101, it is not limited thereto. A semiconductor substrate on which one chip (die) 332 is formed may also be used as the inspection substrate 101. For example, a mask pattern for one chip is intentionally exposure-transferred in order to inspect whether the mask pattern formed on the mask substrate can be used as a pattern, and then, the semiconductor substrate on which the exposure pattern has been formed is used as the inspection substrate 101.

Regarding the mask substrate, a pattern close to a design pattern with auxiliary patterns described above is supposed to have been formed thereon. Thus, when the mask substrate is inspected as the inspection substrate 101, it is effective to perform inspection based on the design pattern with auxiliary patterns. As described above, even if the shape of the auxiliary pattern itself deviates somewhat, it may be possible to use the mask substrate as it is. However, in the inspection apparatus 100, when a reference image is formed based on a design pattern also including auxiliary patterns, since shape comparison is performed with high precision, a portion which does not need to be regarded as a defect, such as explained above, is also detected as a defect. Conversely, if the mask substrate is inspected based on an original design pattern not including auxiliary patterns, the portion in which an auxiliary pattern is formed not to be defective naturally is also determined to be a defect. Thus, according to the first embodiment, when a mask substrate is inspected as the inspection substrate 101, both the data of a design pattern with auxiliary patterns and the data of a design pattern without auxiliary patterns are input in order to generate respective reference images. Then, using the reference image of the design pattern with auxiliary patterns as a main reference image, and the reference image of the design pattern without auxiliary patterns as a sub reference image, inspection of the mask substrate is performed with great precision.

On the other hand, regarding the semiconductor substrate, a pattern close to an original design pattern not including auxiliary patterns is supposed to have been formed thereon. Therefore, when the semiconductor substrate is inspected as the inspection substrate 101, it is effective to perform inspection based on the original design pattern not including auxiliary patterns. However, as described above, actually, a mask pattern in which multiple auxiliary patterns are arranged is exposure-transferred onto the semiconductor substrate, and thus, the shape of the exposure pattern formed on the semiconductor substrate deviates from the original design pattern. However, as long as no failure, such as disconnection and short circuit, occurs, it is sometimes possible to use the semiconductor substrate as it is in circuit design. However, in the inspection apparatus 100, when a reference image is formed based on an original design pattern not including auxiliary patterns, since shape comparison is performed with high precision, a portion which does not need to be regarded as a defect, such as explained above, is also determined as a defect. Thus, according to the first embodiment, when a semiconductor substrate is inspected as the inspection substrate 101, both the data of a design pattern with auxiliary patterns and the data of a design pattern without auxiliary patterns are input in order to generate respective reference images. Then, using the reference image of the design pattern with auxiliary patterns as a main reference image, and the reference image of the design pattern without auxiliary patterns as a sub reference image, inspection of the semiconductor substrate is performed with great precision.

Figure 8:
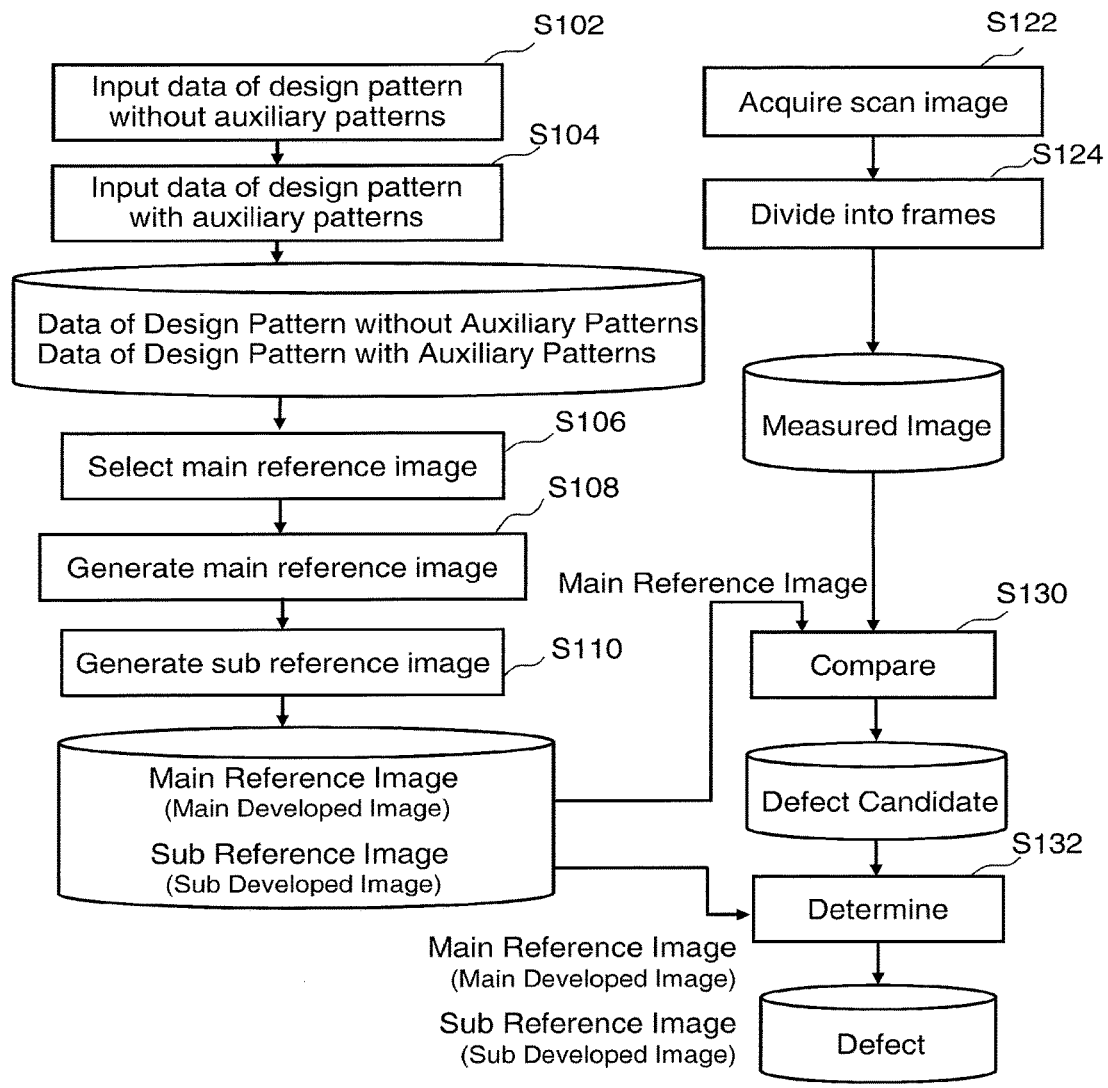
FIG. 8 is a flowchart showing main steps of a pattern inspection method according to the first embodiment.

FIG. 8 is a flowchart showing main steps of a pattern inspection method according to the first embodiment. In FIG. 8, the pattern inspection method of the first embodiment executes a series of steps: an input step (S102) of inputting data of a design pattern without auxiliary patterns, an input step (S104) of inputting data of a design pattern with auxiliary patterns, a main reference image selection step (S106), a main reference image generation step (S108), a sub reference image generation step (S110), a scan image acquisition step (S122), a dividing step (S124), a comparison step (S130), and a determination step (S132). The order of the input step (S102) of inputting data of a design pattern without auxiliary patterns and the input step (S104) of inputting data of a design pattern with auxiliary patterns may be reversed, or alternatively, they may be carried out in parallel. The order of the main reference image selection step (S106) and the main reference image generation step (S108) may be reversed. Further, the steps from the input step (S102) of inputting data of a design pattern without auxiliary patterns to the sub reference image generation step (S110), and the steps from the scan image acquisition step (S122) to the dividing step (S124) may be performed in parallel around the same time. When not performing scanning while continuously moving the XY stage 105 but performing scanning by the "step and repeat" operation, the dividing step (S124) may be omitted.

In the input step (S102) of inputting data of a design pattern without auxiliary patterns, data (first design pattern data) of design pattern without auxiliary patterns in which a design pattern without auxiliary patterns has been defined is input from the outside of the inspection apparatus 100, and stored in the storage device 109.

In the input step (S104) of inputting data of a design pattern with auxiliary patterns, data (second design pattern data) of design pattern with auxiliary patterns, in which a design pattern with auxiliary patterns is defined, is input from the outside of the inspection apparatus 100 and stored in the storage device 109, where the design pattern with auxiliary patterns is obtained by adding the above-described auxiliary patterns for assisting a design pattern without auxiliary patterns to the design pattern without auxiliary patterns.

In the main reference image selection step (S106), the control computer 110 selects, as a main reference image, a predetermined one of a design pattern image (image of a design pattern with auxiliary patterns) based on a design pattern with auxiliary patterns, and a design pattern image (image of a design pattern without auxiliary patterns) based on a design pattern without auxiliary patterns. When the mask substrate on which a mask pattern has been formed based on a design pattern with auxiliary patterns is used as the inspection substrate 101, the image of the design pattern with auxiliary patterns is selected as a main reference image. In such a case, the image of a design pattern without auxiliary patterns is used as a sub reference image. Alternatively, when the semiconductor substrate onto which a mask pattern formed on the mask substrate based on a design pattern with auxiliary patterns has been transferred is used as the inspection substrate 101, the image of a design pattern without auxiliary patterns is selected as a main reference image. In such a case, the image of a design pattern with auxiliary patterns is used as a sub reference image.

In the main reference image generation step (S108), the design pattern image generation unit, such as the development circuit 111 and the reference circuit 112, generates, for each unit inspection region 33, a plurality of main reference images based on design pattern data corresponding to selected main reference images. Specifically, it operates as follows: First, the development circuit 111 reads design pattern data (e.g., in this case, data of a design pattern with auxiliary patterns) corresponding to a selected main reference image from the storage device 109 through the control computer 110, converts each figure pattern in each unit inspection region 33 defined in the read data of a design pattern with auxiliary patterns into image data of binary or multiple values, and transmits this image data to the reference circuit 112.

Here, basics of figures defined by data of a design pattern with auxiliary patterns are, for example, rectangles and triangles. For example, there is stored figure data defining the shape, size, position, and the like of each pattern figure by using information, such as coordinates (x, y) of the reference position of the figure, lengths of sides of the figure, and a figure code serving as an identifier for identifying the figure type such as a rectangle, a triangle and the like.

When data of a design pattern with auxiliary patterns, used as figure data, is input to the development circuit 111, the data is developed into data of each figure. Then, figure codes indicating figure shapes, figure dimensions and the like in the data of each figure are interpreted. Then, the development circuit 111 develops the figure data into design pattern image data of binary or multiple values as patterns to be arranged in squares in units of grids of predetermined quantization dimensions, and outputs the developed data. In other words, the development circuit 111 reads design data, calculates an occupancy rate occupied by figures in the design pattern, for each square obtained by virtually dividing an inspection region into squares in units of predetermined dimensions, and outputs n-bit occupancy rate data. For example, it is preferable that one square is set as one pixel. If one pixel has a resolution of $1/2^8$ (=1/256), 1/256 small regions are allocated to the region of figures arranged in a pixel in order to calculate an occupancy rate in the pixel. Then, the calculated rate is output as 8-bit occupancy rate data to the reference circuit 112. The size of the square (inspection pixel) is preferably the same as that of the measurement pixel 36 (or grid 29) in accordance with measured data.

The reference circuit 112 performs appropriate filter processing on design image data of a design pattern with auxiliary patterns which is, namely, transmitted figure image data. Since the measured data being a measured image obtained from the detection circuit 106 is in the state affected by the filtering by the electron optical system, in other words, in the analog state continuously changing, it is possible to match the measured data with design image data by performing filter processing on the design image data which is image data on the design side whose image intensity (gray value) is represented by digital values. In this manner, a main reference image which can be compared with a measured image (secondary electron image) in the unit inspection region 33 is generated. Image data of the generated main reference image is output to the comparison circuit 108 and the determination circuit 140. The main reference image having been input in the comparison circuit 108 and the determination circuit 140 is stored in respective memories described later.

In the sub reference image generation step (S110), the design pattern image generation unit, such as the development circuit 111 and the reference circuit 112, generates, for each inspection region 33, a plurality of sub reference images based on design pattern data corresponding to sub reference images which were not selected as the main reference image. Specifically, it operates as follows: First, the development circuit 111 reads design pattern data (e.g., in this case, data of a design pattern without auxiliary patterns) corresponding to a sub reference image from the storage device 109 through the control computer 110, converts each figure pattern in each unit inspection region 33 defined in the read data of a design pattern without auxiliary patterns into image data of binary or multiple values, and transmits this image data to the reference circuit 112.

Similar to the data of a design pattern with auxiliary patterns, basics of figures defined by data of a design pattern without auxiliary patterns are, for example, rectangles and triangles. For example, there is stored figure data defining the shape, size, position, and the like of each pattern figure by using information, such as coordinates (x, y) of the reference position of the figure, lengths of sides of the figure, and a figure code serving as an identifier for identifying the figure type such as a rectangle, a triangle and the like. Therefore, processing similar to that of the data of a design pattern with auxiliary patterns is performed by the development circuit 111.

Next, the reference circuit 112 performs appropriate filter processing on design image data of a design pattern without auxiliary patterns which is, namely, transmitted figure image data. The processing can be performed using a similar filter function to that of the data of a design pattern with auxiliary patterns. Thus, a sub reference image which can be compared with a measured image (secondary electron image) in the unit inspection region 33 is generated. Image data of the generated sub reference image is output to the storage device 109 and the determination circuit 140. The reference image having been input in the determination circuit 140 is stored in a memory described later.

As described above, the design pattern image generation unit, such as the development circuit 111 (and reference circuit 112) develops the image of the design pattern (first design pattern) without auxiliary patterns so as to generate an image (first design pattern image) of a design pattern without auxiliary patterns defined by pixel data, and develops the image of the design pattern (second design pattern) with auxiliary patterns so as to generate an image (second design pattern image) of a design pattern with auxiliary patterns defined by pixel data.

In the scan image acquisition step (S122), the measured image acquisition unit 150 acquires a measured image of a pattern formed on the inspection substrate 101. Specifically, the measured image acquisition unit 150 scans the substrate 101 by using the multi-beams 20 composed of a plurality of electron beams. The scanning operation has already been described with reference to FIGS. 4 to 7. By performing this operation, a measured image (measured data) is acquired for each unit inspection region 33. The acquired measured image (measured data) is output to the comparison circuit 108.

Although in the above the measured image acquisition unit 150 acquires a measured image (measured data) for each unit inspection region 33, it is not limited thereto. The measured image (measured data) may be acquired for each stripe region 32. For example, in the case of performing a scanning operation while continuously moving the XY stage 105, preferably, a measured image (measured data) is acquired for each stripe region 32. In that case, since the acquired data becomes stripe data for each stripe region 32, the dividing step (S124) being the next step can be carried out. In the case of acquiring measured data for each unit inspection region 33, the dividing step (S124) may be omitted.

Figure 9:
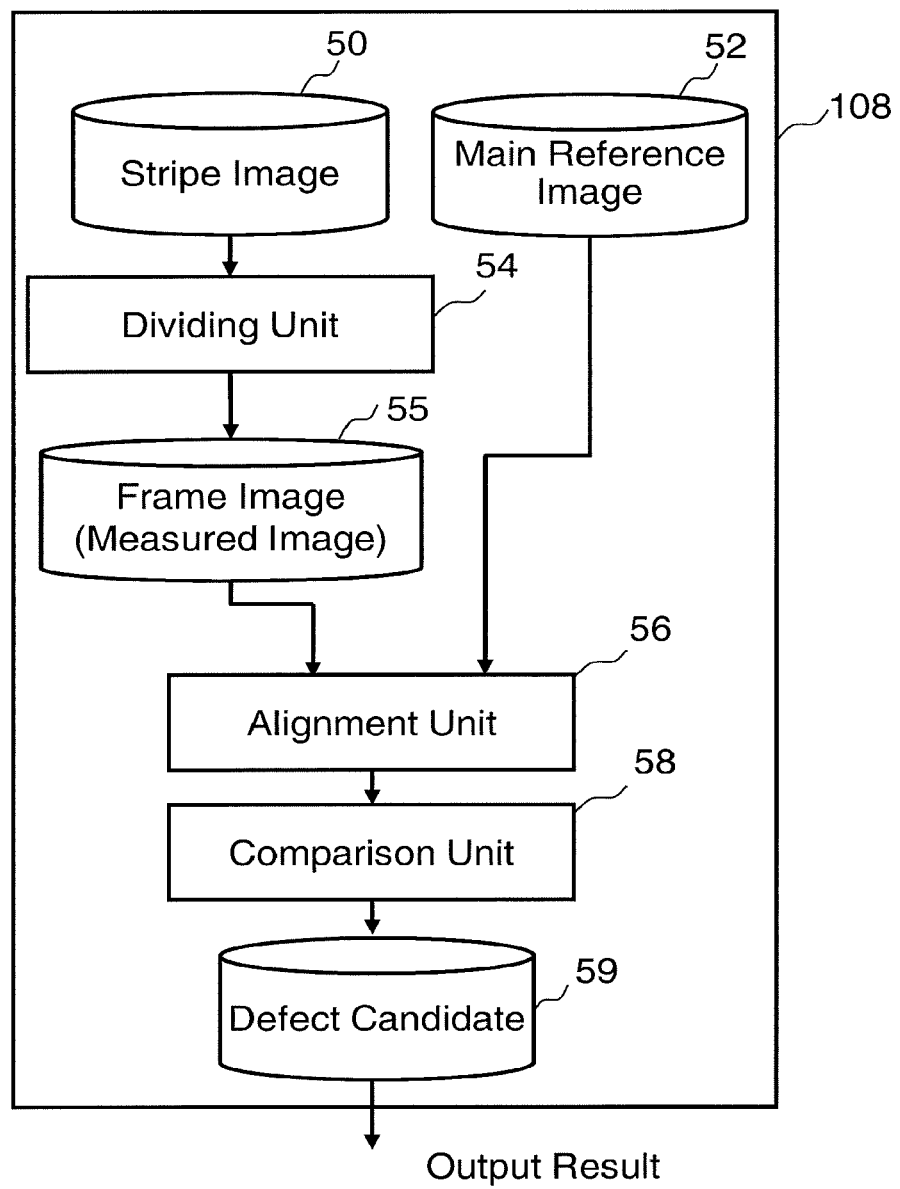
FIG. 9 shows an internal configuration of a comparison circuit according to the first embodiment.

FIG. 9 shows an internal configuration of a comparison circuit according to the first embodiment. In FIG. 9, storage devices 50, 52, 55 and 59, such as magnetic disk drives, a dividing unit 54, an alignment unit 56, and a comparison unit 58 are arranged in the comparison circuit. Each of the "units" such as the dividing unit 54, the alignment unit 56, and the comparison unit 58 includes a processing circuitry. As the processing circuitry, for example, an electric circuit, computer, processor, circuit board, quantum circuit, or semiconductor device may be used. Each of the "units" may use a common processing circuitry (same processing circuitry), or different processing circuitries (separate processing circuitries). Input data required in the dividing unit 54, the alignment unit 56, and the comparison unit 58, and calculated results are stored in a memory 118 or a memory (not shown) in the comparison unit 108 each time. In the case where the measured image acquisition unit 150 performs a scanning operation by the "step and repeat" operation, the storage device 50 and the dividing unit 54 may be omitted.

In the case where the measured image acquisition unit 150 performs a scanning operation by the "step and repeat" operation, or the like, measured data for each unit inspection region 33 output to the comparison circuit 108 is stored in the storage device 55. Data of a main reference image is stored in the storage device 52. In the case where the measured image acquisition unit 150 performs a scanning operation while continuously moving the XY stage 105, or the like, measured data (stripe data) for each stripe region 32 output to the comparison circuit 108 is stored in the storage device 50.

In the dividing step (S124), the dividing unit 54 divides stripe data into a plurality of frame images by the size of the unit inspection region 33. Each frame image is stored in the storage device 55. By this processing, image data for each stripe region 32 can be processed into image data for each unit inspection region 33.

In the comparison step (S130), in order to detect a defect candidate, the comparison circuit 108 compares, for each inspection pixel, a main reference image with a measured image (secondary electron image) by using, as a main reference image, a predetermined one of an image (first design pattern image) of a design pattern without auxiliary patterns and an image (second design pattern image) of a design pattern with auxiliary patterns. When a mask substrate on which a mask pattern has been formed based on a design pattern (second design pattern) with auxiliary patterns is used as the inspection substrate 101, the comparison circuit 108 uses the image (second design pattern image) of the design pattern with auxiliary patterns, as a main reference image. When a semiconductor substrate onto which a mask pattern formed on the mask substrate based on a design pattern (second design pattern) with auxiliary patterns has been transferred is used as the inspection substrate 101, the comparison circuit 108 uses the image (first design pattern image) of a design pattern without auxiliary patterns, as a main reference image. Specifically, it operates as follows: First, the alignment unit 56 reads, for each unit inspection region 33, measured data which configures a measured image of the unit inspection region 33 concerned, and image data of a corresponding main reference image, and performs alignment between the measured image of the unit inspection region 33 concerned and the corresponding main reference image. Preferably, the alignment is performed for each sub pixel smaller than the measurement pixel 36 (or grid 29) serving as an inspection pixel. For example, the alignment is carried out using a least-squares methods.

The comparison unit 58 compares the measured image (secondary electron image) concerned and the main reference image which have been aligned, for each measurement pixel 36 (or grid 29) used as an inspection pixel. The comparison unit 58 compares both the images, based on predetermined determination conditions by using a predetermined determination threshold (first determination threshold), for each measurement pixel 36 (or grid 29) used as an inspection pixel, in order to determine whether there is a defect, such as a shape defect. For example, if a gray-scale value difference for each measurement pixel 36 (or grid 29) is larger than a determination threshold Th (first determination threshold), it is determined to be a defect candidate. Then, the comparison result is output. Specifically, it is output to the determination circuit 140 and the storage device 109.

Figure 10:
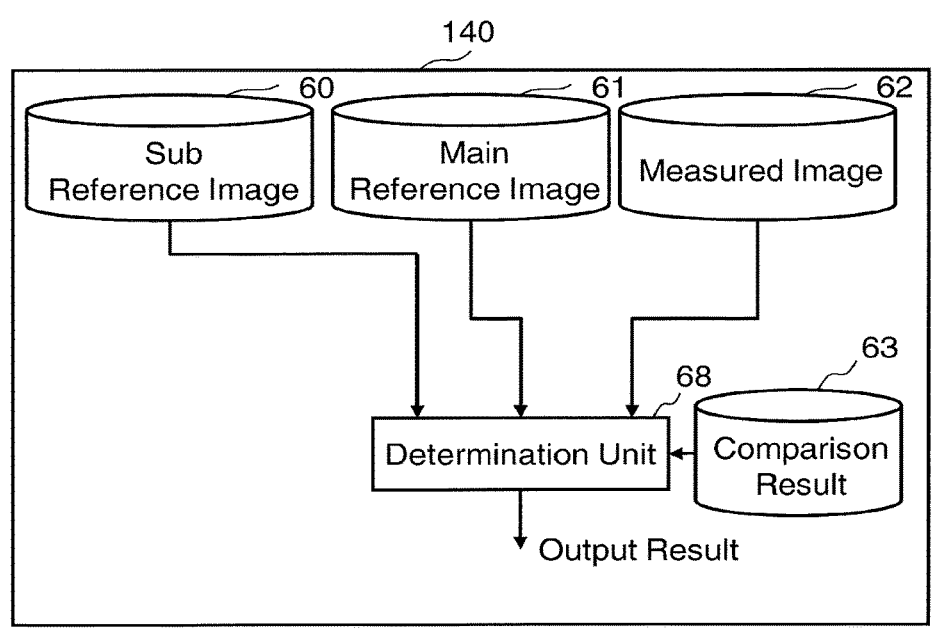
FIG. 10 shows an internal configuration of a determination circuit according to the first embodiment.

FIG. 10 shows an internal configuration of a determination circuit according to the first embodiment. In FIG. 10, storage devices 60, 61, 62, and 63, such as magnetic disk drives, and a determination unit 68 are arranged in the determination circuit 140. The determination unit 68 includes a processing circuitry, and as the processing circuitry, for example, an electric circuit, computer, processor, circuit board, quantum circuit, or semiconductor device may be used. Input data required in the determination circuit 68, and calculated results are stored in the memory 118 or a memory (not shown) in the determination unit 140 each time.

The image data of the generated sub reference image is stored in the storage device 60. The image data of the main reference image is stored in the storage device 61. Measured data is stored in the storage device 62. Comparison results of the comparison circuit 108 are stored in the storage device 63.

In the determination step (S132), the determination unit 68 determines whether a defect candidate is a defect by using determination conditions obtained when the other predetermined one of an image (first design pattern image) of a design pattern without auxiliary patterns and an image (second design pattern image) of a design pattern with auxiliary patterns is used as a sub reference image. Specifically, it operates as follows: The determination unit 68 reads the position of the inspection pixel being a defect candidate from the storage device 63. Also, the determination unit 68 reads the pixel value (gray scale value) of the inspection pixel being a defect candidate from the sub reference image stored in the storage device 60. Similarly, the determination unit 68 reads the pixel value (gray scale value) of the inspection pixel being a defect candidate from the main reference image stored in the storage device 61. Further, the determination unit 68 reads the pixel value (gray scale value) of the inspection pixel being a defect candidate from the measured image stored in the storage device 62. Then, for each pixel (inspection pixel) of the defect candidate, determination unit 68 determines the defect candidate to be a defect when the pixel value of the defect candidate of the measured image is a value out of range between the pixel value of the main reference image and the pixel value of the sub reference image. In the case except this, the defect candidate is not regarded as a defect.

Figure 11A:
FIGS. 11A to 11C show examples of a design pattern without auxiliary patterns, a design pattern with auxiliary patterns, and a measured pattern obtained from a measured image according to the first embodiment.
Figure 11B:
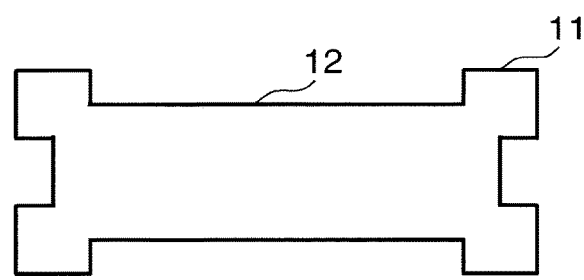
Figure 11C:
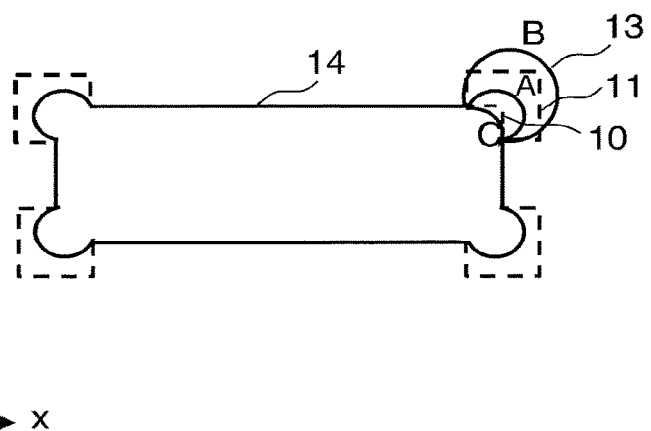

FIGS. 11A to 11C show examples of a design pattern without auxiliary patterns, a design pattern with auxiliary patterns, and a measured pattern obtained from a measured image according to the first embodiment. FIG. 11A shows a rectangular design pattern 10 (original design pattern) without auxiliary patterns. FIG. 11B shows a design pattern 12 with auxiliary patterns, which can be obtained by arranging auxiliary patterns 11 for OPC at the four corners of the design pattern 10 without auxiliary patterns shown in FIG. 11A. FIG. 11C shows a measured pattern 14 obtained from a measured image acquired from the mask substrate on which the design pattern 12 with auxiliary patterns is formed, or obtained from a measured image acquired from the semiconductor substrate onto which a mask pattern has been exposure-transferred by using the mask substrate on which the design pattern 12 with auxiliary patterns is formed. As shown in FIG. 11C, the shape of four corners of the measured pattern 14 can be one of (A) bulgingly protruding from the design pattern 10 but the bulging portion being smaller than the auxiliary pattern 11, (B) the bulging portion being larger than the auxiliary pattern 11, and (C) the corner portion roundly diminishing in size from that of the design pattern 10.

Here, according to the first embodiment, whether the inspection substrate 101 is a mask substrate or a semiconductor substrate, it is sufficient to be the case (A) where the shape of the four corner portions 13 of the measured pattern 14 bulgingly protrudes from the design pattern 10 but the bulging portion is smaller than the auxiliary pattern 11. In other words, it is determined that the inspection substrate 101 can be used as long as the end portion of the four corners 13 of the measured pattern 14 is coincident with the end of the four corners of the design pattern 10 or the end of the auxiliary pattern 11, or exists between them. If a defect candidate of the measured image exists near/close to one of the four corners of the measured pattern 14, it will be described below. In the case of (A) described above, the pixel value of the defect candidate of the measured image is between the pixel value of the main reference image and the pixel value of the sub reference image. In other words, the pixel value of the defect candidate of the measured image is between (inclusive) the pixel value of the image of a design pattern without auxiliary patterns and the pixel value of the image of a design pattern with auxiliary patterns. In the case of (B) where the bulging portion of the four corner portions 13 of the measured pattern 14 is larger than the auxiliary pattern 11, the pixel value of the defect candidate of the measured image is larger than both the pixel value of the main reference image and the pixel value of the sub reference image. In other words, the pixel value of the defect candidate of the measured image is larger than both the pixel value of the image of a design pattern without auxiliary patterns and the pixel value of the image of a design pattern with auxiliary patterns. In the case of (C) where the corner portion of the four corners 13 of the measured pattern 14 roundly diminishes in size from that of the design pattern 10, the pixel value of the defect candidate of the measured image is smaller than both the pixel value of the main reference image and the pixel value of the sub reference image.

If a defect candidate of the measured image exists in a pixel irrelevant to the position near/close to one of the four corners of the measured pattern 14, (that is, irrelevant to the position near/close to the place where the auxiliary pattern 11 is formed), usually, the pixel value of the image of a design pattern without auxiliary patterns and the pixel value of the image of a design pattern with auxiliary patterns are the same values. In the case of being convex from the end portion of the measured pattern 14, the pixel value of the defect candidate is larger than both the pixel value of the image of a design pattern without auxiliary patterns and the pixel value of the image of a design pattern with auxiliary patterns. Conversely, in the case of being concave from the end portion of the measured pattern 14, the pixel value of the defect candidate is smaller than both the pixel value of the image of a design pattern without auxiliary patterns and the pixel value of the image of a design pattern with auxiliary patterns. Therefore, even if determination is similarly performed using a criterion for the shape of the four corners of the measured pattern 14, there is no problem in results. Determination results may be output to the storage device 109, the monitor 117, or the memory 118, or output from the printer 119.

As described above, according to the first embodiment, it is possible to reduce detecting, as a defect, a portion which does not need to be regarded as a defect due to an auxiliary pattern.

Second Embodiment

In the first embodiment, it is determined not to be a defect if the end portion of the four corners of the measured pattern 14 is coincident with the end of the four corners of the design pattern 10 or the end of the auxiliary pattern 11, or exists between them. However, the determination method is not limited thereto. A second embodiment describes the case of varying the determination threshold to be compared. The structure of the inspection apparatus 100 of the second embodiment is the same as that of FIG. 1. The flowchart of a pattern inspection method according to the second embodiment is the same as that of FIG. 8. Hereinafter, the contents of the second embodiment are the same as those of the first embodiment except for what is specifically described below.

The contents of each step from the input step (S102) of inputting data of a design pattern without auxiliary patterns to the comparison step (S130) are the same as those of the first embodiment.

Figure 12:
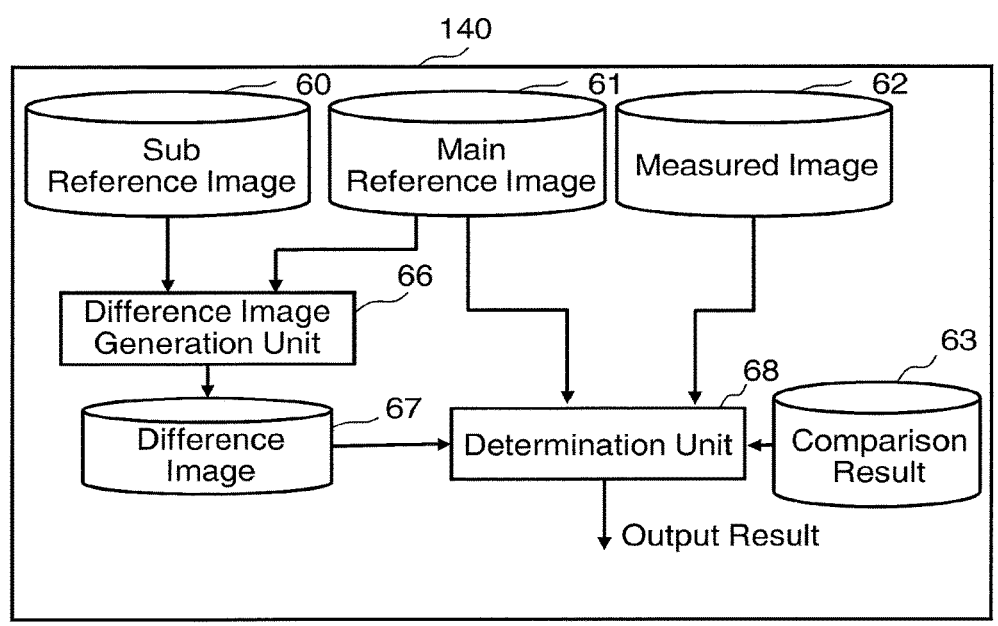
FIG. 12 shows an internal configuration of a determination circuit according to a second embodiment.

FIG. 12 shows an internal configuration of a determination circuit according to a second embodiment. In FIG. 12, storage devices 60, 61, 62, 63, and 67, such as magnetic disk drives, a difference image generation unit 66, and a determination unit 68 are arranged in the determination circuit 140. Each of the "units" such as the difference image generation unit 66 and the determination unit 68 includes a processing circuitry. As the processing circuitry, for example, an electric circuit, computer, processor, circuit board, quantum circuit, or semiconductor device may be used. Each of the "units" may use a common processing circuitry (same processing circuitry), or different processing circuitries (separate processing circuitries). Input data required in the difference image generation unit 66 and the determination unit 68, and calculated results are stored in the memory 118 or a memory (not shown) in the determination unit 140 each time.

In the determination step (S132), first, the difference image generation unit 66 generates, for each pixel, a difference image defined by a difference value obtained by subtracting the value of an image (first design pattern image) of a design pattern without auxiliary patterns from the value of an image (second design pattern image) of a design pattern with auxiliary patterns. The difference image is stored in the storage device 67.

Figure 13A:
FIGS. 13A to 13C show examples of a design pattern without auxiliary patterns, a design pattern with auxiliary patterns, and a difference image pattern according to the second embodiment.
Figure 13B:
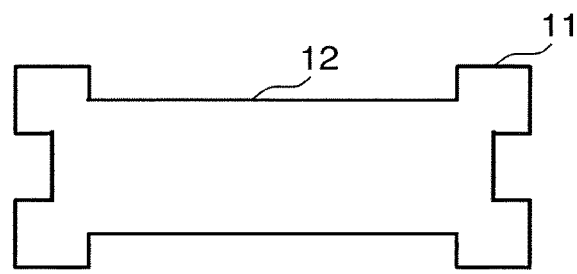
Figure 13C:
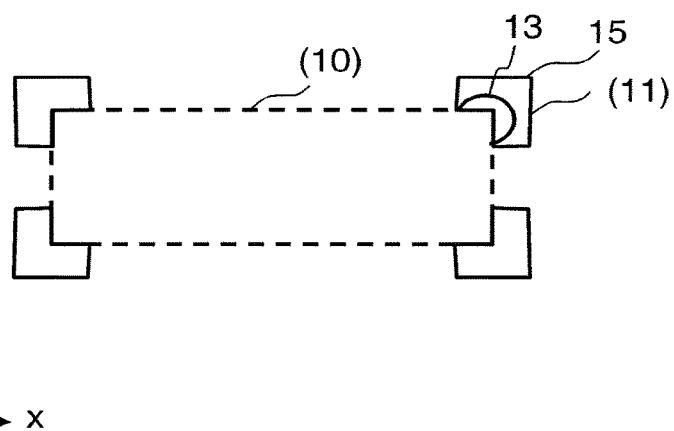

FIGS. 13A to 13C show examples of a design pattern without auxiliary patterns, a design pattern with auxiliary patterns, and a difference image pattern according to the second embodiment. FIG. 13A shows the rectangular design pattern 10 (original design pattern) without auxiliary patterns. FIG. 13B shows the design pattern 12 with auxiliary patterns, which can be obtained by arranging auxiliary patterns 11 for OPC at the four corners of the design pattern 10 without auxiliary patterns shown in FIG. 13A. In FIG. 13C, there remains an added portion 15 being a difference image, as an auxiliary pattern, obtained by subtracting the image of the design pattern 10 without auxiliary patterns from the image of the design pattern 12 with auxiliary patterns. According to the second embodiment, when each of the four corner portions 13 of the measured pattern 14 exists in the portion 15 which remains as a difference image, namely when the portion 13 overlaps with the portion 15, the determination threshold is to be loosened (or "moderated") (increased, for example).

Next, the determination unit 68 determines whether the pixel being a defect candidate is a pixel whose image remains in a difference image, and in other words, determines whether the pixel being a defect candidate is a pixel for which a pixel value of a finite value is defined. Then, when the pixel being a defect candidate is a pixel whose image remains in the difference image, the determination unit 68 determines whether the defect candidate concerned is a defect by recomparing, with respect to the pixel being a defect candidate, a main reference image with a measured image (secondary electron image) by using the determination threshold Th' (second determination threshold) obtained by increasing the determination threshold Th (first determination threshold) used in the comparison circuit 108. For example, it is preferable to use a loosened (increased, for example) determination threshold (second determination threshold) by loosening (or "moderating") (increasing, for example) the determination threshold used in the comparison circuit 108 down to its 80%. In spite of loosening (or "moderating") (increasing, for example) the determination threshold, if the defect candidate is still out of the tolerance, it is determined that the defect candidate concerned is a defect. Defect candidates out of the portion 15 which remains as a difference image can be regarded as defects in the first place. Determination results may be output to the storage device 109, the monitor 117, or the memory 118, or output from the printer 119.

As described above, according to the second embodiment, it is possible to reduce detecting, as a defect, a portion which does not need to be regarded as a defect due to an auxiliary pattern, by loosening (increasing, for example) the determination threshold with respect to the portion 15 remaining as a difference image.

Third Embodiment

In the second embodiment, the determination threshold is uniformly loosened (or "moderated") (increased, for example) with respect to a region (pixel) in a difference image regardless of the sizes of the original design pattern and the auxiliary pattern to be added. However, it is not limited thereto. A third embodiment describes the case of varying the threshold, depending on the sizes of an original design pattern and an auxiliary pattern to be added. The structure of the inspection apparatus 100 of the third embodiment is the same as that of FIG. 1. The flowchart of a pattern inspection method according to the third embodiment is the same as that of FIG. 8. Hereinafter, the contents of the third embodiment are the same as those of the first embodiment except for what is specifically described below.

The contents of each step from the input step (S102) of inputting data of a design pattern without auxiliary patterns to the comparison step (S130) are the same as those of the first embodiment.

However, according to the third embodiment, in the main reference image generation step (S108), image data (main reference image (before filtering)) having been already converted into binary or multiple values by the development circuit 111 is output to the reference circuit 112, and also output to the determination circuit 140. Similarly, in the sub reference image generation step (S110), image data (sub reference image (before filtering)) having been already converted into binary or multiple values by the development circuit 111 is output to the reference circuit 112, and also output to the determination circuit 140.

Figure 14:
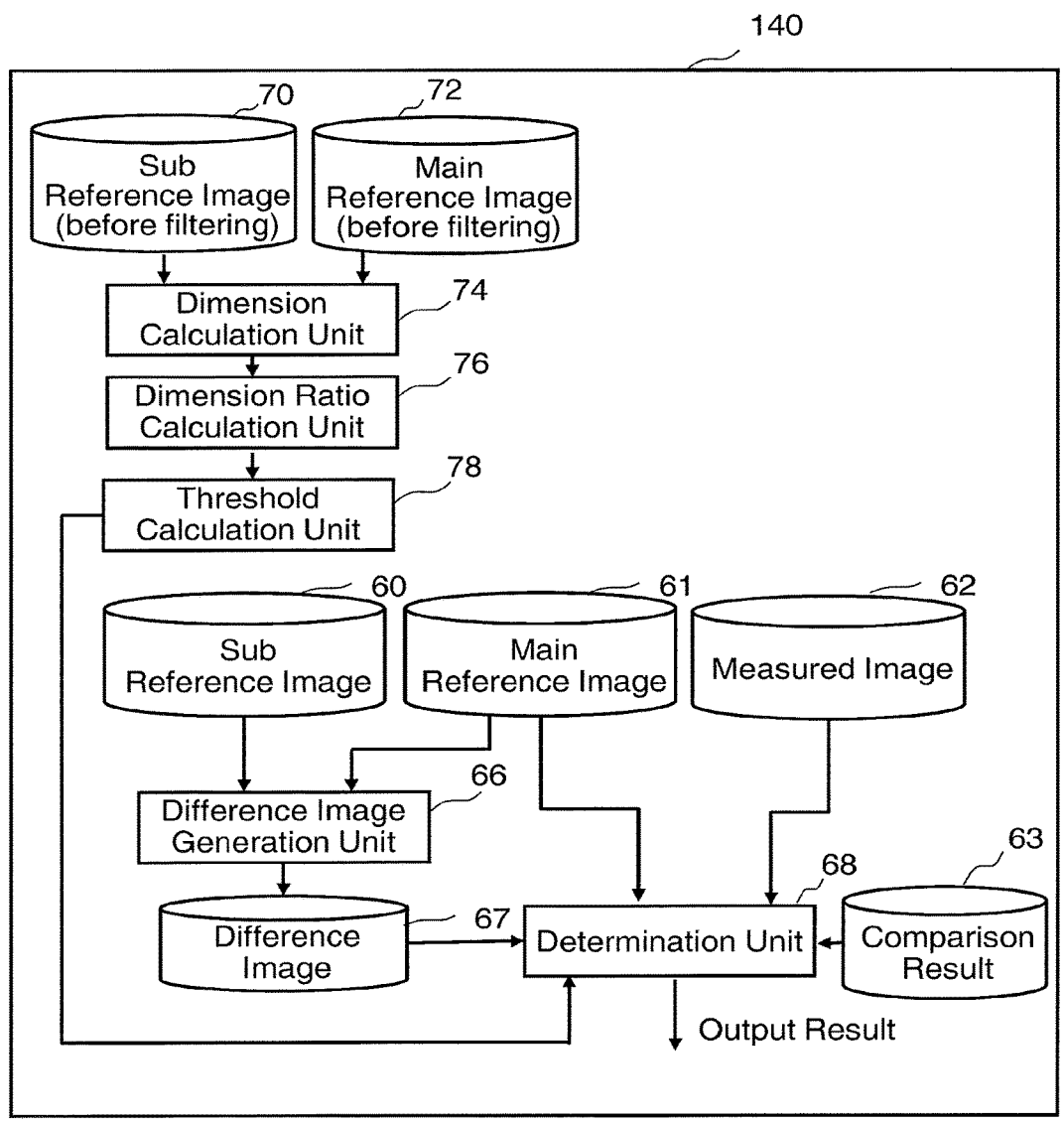
FIG. 14 shows an internal configuration of a determination circuit according to a third embodiment.

FIG. 14 shows an internal configuration of a determination circuit according to a third embodiment. FIG. 14 is the same as FIG. 12 except that storage devices 70 and 72, such as magnetic disk drives, a dimension calculation unit 74, a dimension ratio calculation unit 76, and a threshold calculation unit 78 are added in the determination circuit 140. Each of the "units" such as the difference image generation unit 66, the determination unit 68, the dimension calculation unit 74, the dimension ratio calculation unit 76, and the threshold calculation unit 78 includes a processing circuitry. As the processing circuitry, for example, an electric circuit, computer, processor, circuit board, quantum circuit, or semiconductor device may be used. Each of the "units" may use a common processing circuitry (same processing circuitry), or different processing circuitries (separate processing circuitries). Input data required in the difference image generation unit 66, the determination unit 68, the dimension calculation unit 74, the dimension ratio calculation unit 76, and the threshold calculation unit 78, and calculated results are stored in the memory 118 or a memory (not shown) in the determination circuit 140 each time.

The sub reference image (before filtering) having been input into the determination circuit 140 is stored in the storage device 70, and the main reference image (before filtering) is stored in the storage device 72.

In the determination step (S132), the respect that the difference image generation unit 66 generates a difference image, and the difference image is stored in the storage device 67 is the same as that of the second embodiment.

In the determination step (S132) of the third embodiment, further, the dimension calculation unit 74 reads a sub reference image (before filtering) from the storage device 70, and calculates dimensions of each figure pattern in the sub reference image (before filtering). Similarly, the dimension calculation unit 74 reads a main reference image (before filtering) from the storage device 72, and calculates dimensions of each figure pattern in the main reference image (before filtering). Dimensions close to the designed dimension can be obtained by using an image before performing filtering processing in the reference circuit 112.

Figure 15A:
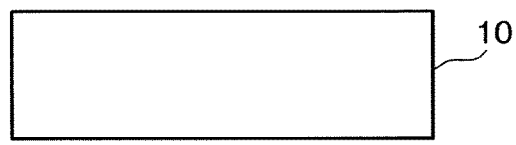
FIGS. 15A to 15C show examples of a design pattern without auxiliary patterns, a design pattern with auxiliary patterns, and a measured pattern according to the third embodiment.
Figure 15B:
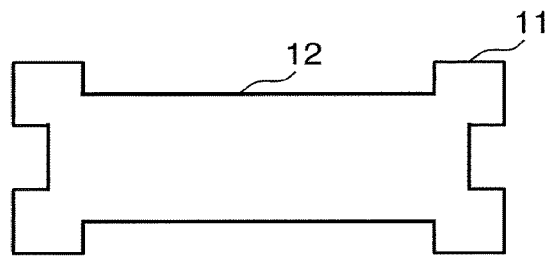
Figure 15C:
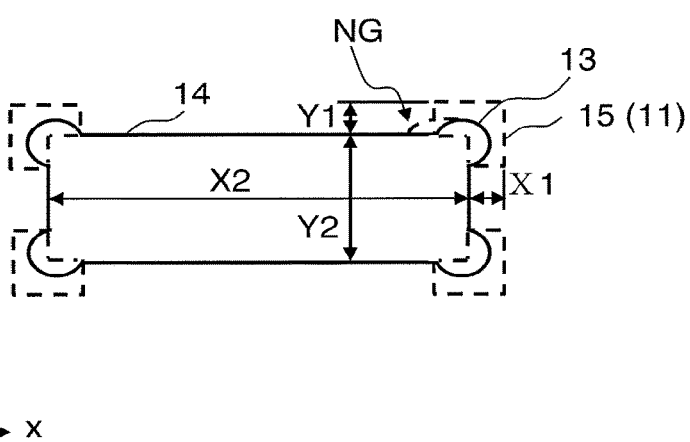

FIGS. 15A to 15C show examples of a design pattern without auxiliary patterns, a design pattern with auxiliary patterns, and a measured pattern according to the third embodiment. FIG. 15A shows the rectangular design pattern 10 (original design pattern) without auxiliary patterns. FIG. 15B shows the design pattern 12 with auxiliary patterns, which can be obtained by arranging auxiliary patterns 11 for OPC at the four corners of the design pattern 10 without auxiliary patterns shown in FIG. 15A. If it is before filtering processing by the reference circuit 112, by developing the image of the design pattern 10 without auxiliary patterns in the development circuit 111, the shape of the image of the design pattern without auxiliary patterns becomes the same as the shape of the design pattern 10 without auxiliary patterns. Similarly, if it is before filtering processing by the reference circuit 112, by developing the image of the design pattern 12 with auxiliary patterns in the development circuit 111, the shape of the image of the design pattern with auxiliary patterns becomes the same as the shape of the design pattern 12 with auxiliary patterns. One of the main reference image (before filtering) and the sub reference image (before filtering) is the image of the design pattern without auxiliary patterns, and the other is the image of the design pattern with auxiliary patterns. The dimension calculation unit 74 can obtain the x direction dimension (X2) and the y direction dimension (Y2) of the image of the design pattern (original design pattern) without auxiliary patterns by calculating dimensions of the image of the design pattern (original design pattern) without auxiliary patterns as shown in FIG. 15C. Furthermore, the dimension calculation unit 74 can obtain the x direction dimension (X1) of the auxiliary pattern 11 in the image of the design pattern with auxiliary patterns by calculating the x direction dimension and the y direction dimension of the image of the design pattern with auxiliary patterns, and subtracting the x direction dimension of the image of the design pattern (original design pattern) without auxiliary patterns from the x direction dimension of the image of the design pattern with auxiliary patterns as shown in FIG. 15C. Similarly, the dimension calculation unit 74 can obtain the y direction dimension (Y1) of the auxiliary pattern 11 in the image of the design pattern with auxiliary patterns by subtracting the y direction dimension of the image of the design pattern (original design pattern) without auxiliary patterns from the y direction dimension of the image of the design pattern with auxiliary patterns as shown in FIG. 15C.

Next, the dimension ratio calculation unit 76 calculates a dimension ratio X1/X2 with respect to the x direction dimension and a dimension ratio Y1/Y2 with respect to the y direction dimension of the image of the original design pattern without auxiliary patterns to the auxiliary pattern 11.

In other words, the x direction dimension (X1) and the y direction dimension (Y1) are difference values (X1, Y1). The difference values (X1, Y1) are calculated by subtracting a pattern dimension obtained by using the image (second design pattern image) of a design pattern with auxiliary patterns from a pattern dimension obtained by using the image (first design pattern image) of a design pattern without auxiliary patterns. The image (second design pattern image) is one of the main reference image (before filtering) and the sub reference image (before filtering). The image (first design pattern image) is the other one of the main reference image (before filtering) and the sub reference image (before filtering). Then, the dimension ratio X1/X2 and the dimension ratio Y1/Y2 are ratios (X1/X2, Y1/Y2). The ratios (X1/X2, Y1/Y2) are calculated by dividing the difference value (X1, Y1) by pattern dimensions (X2, Y2). Then, the threshold calculation unit 78 calculates a determination threshold Th" (second determination threshold) by correcting a determination threshold Th (first determination threshold) used in the comparison circuit 108, by using the ratios (X1/X2, Y1/Y2).

For example, the threshold calculation unit 78 calculates an x direction determination threshold Th" by multiplying a value, which is obtained by adding a constant 1 to X1/X2, by the determination threshold Th (first determination threshold) used in the comparison circuit 108.

$$Th''=(X1/X2+1)\cdot Th \quad \text{Equation (1-1):}$$

Similarly, the threshold calculation unit 78 calculates a y direction determination threshold Th" by multiplying a value, which is obtained by adding a constant 1 to Y1/Y2, by the determination threshold Th (first determination threshold) used in the comparison circuit 108.

$$Th''=(Y1/Y2+1)\cdot Th \quad \text{Equation (1-2):}$$

Thereby, it is possible to obtain a determination threshold Th" (second determination threshold) which is variable depending on the size of the original design pattern and the size of the auxiliary pattern to be added, and which is looser (higher, for example) than the determination threshold Th used in the comparison circuit 108.

Next, the determination unit 68 determines whether the pixel being a defect candidate is a pixel whose image remains in a difference image, and in other words, determines whether the pixel being a defect candidate is a pixel for which a pixel value of a finite value is defined. Then, when the pixel being a defect candidate is a pixel whose image remains in the difference image, the determination unit 68 determines whether the defect candidate concerned is a defect by recomparing, with respect to the pixel being a defect candidate, a main reference image with a measured image (secondary electron image) by using the determination threshold Th" (second determination threshold) obtained by loosening (increasing, for example) the determination threshold Th (first determination threshold) used in the comparison circuit 108. According to the third embodiment, the determination threshold Th" (second determination threshold) is used which is obtained by loosening (increasing, for example) the determination threshold Th, used in the comparison circuit 108, according to a dimension ratio of the design pattern to the auxiliary pattern. In spite of loosening (increasing, for example) the determination threshold, if the defect candidate is still out of the tolerance, it is determined that the defect candidate concerned is a defect. As shown in FIG. 15C, defect candidates out of the portion 15 which remains as a difference image can be regarded as defects (NG, unacceptable) in the first place.

Further, according to the third embodiment, since the x direction determination threshold Th" and the y direction determination threshold Th" are intentionally separately calculated, a defect can be removed as long as determined to be "NG" (unacceptable) with respect to one of the x and y directions even if determined to be "OK" (acceptable) with respect to the other direction. Determination results may be output to the storage device 109, the monitor 117, or the memory 118, or output from the printer 119.

In the third embodiment, as described above, by loosening (increasing, for example) the determination threshold according to a dimension ratio of the design pattern to the auxiliary pattern, it is possible to high precisely reduce detecting, as a defect, a portion which does not need to be regarded as a defect due to an auxiliary pattern, with respect to the portion 15 remaining as a difference image.

In the above description, each " . . . circuit" includes a processing circuitry. As the processing circuitry, for example, an electric circuit, computer, processor, circuit board, quantum circuit, semiconductor device, or the like can be used. Each " . . . circuit" may use a common processing circuitry (same processing circuitry), or different processing circuitries (separate processing circuitries). A program for causing a computer to execute the processor and the like can be stored in a recording medium, such as a magnetic disk drive, magnetic tape drive, FD, ROM (Read Only Memory), etc. For example, the position circuit 107, the comparison circuit 108, the development circuit 111, the reference circuit 112, the determination circuit 140, and the like may be configured by at least one processing circuit described above.

Embodiments have been explained referring to specific examples described above. However, the present invention is not limited to these specific examples. For example, although, in the first embodiment described above, sub reference images are generated for the pixel being a defect candidate, and are further generated with respect to regions other than the pixel being a defect candidate, it is not limited thereto. The sub reference image may be generated only for the pixel being a defect candidate (or including peripheral pixels), and generation of the sub reference image for the other pixels may be omitted. Further, although, in the first embodiment, a difference image described in the second embodiment is not generated, it may be generated. Then, it is also preferable to configure such that whether the pixel being a defect candidate is a pixel having a pixel value of a finite value in the difference image is determined, and if the pixel being a defect candidate is a pixel having a pixel value of a finite value in the difference image, it is determined based on determination conditions whether the defect candidate is a defect or not. Then, when the defect candidate is not a pixel having a pixel value of a finite value in the difference image, it is determined to be a defect as a usual procedure. As an effect of generating a difference image, calculation processing can be omitted when a defect candidate is not a pixel having a pixel value of a finite value in the difference image, thereby reducing a calculation time compared with not generating a difference image.

Moreover, the inspection apparatus 100 may be a dedicated machine using a mask substrate as the inspection substrate 101. Alternatively, the inspection apparatus 100 may be a dedicated machine using a semiconductor substrate as the inspection substrate 101. In both these cases, a design pattern with auxiliary patterns and a design pattern without auxiliary patterns are input so as to develop their images, and one of these design patterns is used as a main reference image, and the other is used as a sub reference image.

Alternatively, the inspection apparatus 100 may handle both the mask substrate and the semiconductor substrate, as the inspection substrate 101. Although the size of a pattern formed on the semiconductor substrate is smaller because the pattern is formed by reduction-exposing a mask pattern formed on the mask substrate, when performing a pattern inspection, it is sufficient just to adjust measurement magnifications of a measured image depending on the substrate to be used as the inspection substrate 101. For example, the size of an inspection pixel may be adjusted. In the case of making the size of an inspection pixel larger than the measurement pixel 36, a statistic value (e.g., average value) of pixel values of a plurality of measurement pixels 36 in the inspection pixel can be a pixel value of the inspection pixel concerned. Alternatively, a detector whose resolution is different from that of the detector 222 may be separately arranged to be properly used according to the type of the inspection substrate 101.

While the apparatus configuration, control method, and the like not directly necessary for explaining the present invention are not described, some or all of them can be selectively used on a case-by-case basis when needed.

In addition, any other pattern inspection method and pattern inspection apparatus that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
   a measured image acquisition mechanism configured to acquire a measured image of a pattern formed on an inspection substrate, by using one of an electron beam and a laser beam;
   a storage device configured to store first design pattern data defining a first design pattern, and second design pattern data defining a second design pattern obtained by adding an auxiliary pattern for assisting the first design pattern to the first design pattern;
   a design pattern image generation circuit configured to generate a first design pattern image which is defined by pixel data obtained by developing an image of the first design pattern, and a second design pattern image which is defined by pixel data obtained by developing an image of the second design pattern;
   a comparison circuit configured to detect a defect candidate by comparing, for each pixel, the measured image with a main reference image which is a predetermined one of the first design pattern image and the second design pattern image; and
   a determination circuit configured to determine whether the defect candidate is a defect by using determination conditions obtained using, as a sub reference image, another predetermined one of the first design pattern image and the second design pattern image.

2. The apparatus according to claim 1, wherein, in a case of using, as the inspection substrate, a mask substrate on which the pattern has been formed based on the second design pattern, the second design pattern image is used as the main reference image.

3. The apparatus according to claim 1, wherein, in a case of using, as the inspection substrate, a substrate onto which a mask pattern formed on a mask substrate based on the second design pattern has been transferred, the first design pattern image is used as the main reference image.

4. The apparatus according to claim 1, wherein the determination circuit determines the defect candidate to be a defect in a case where a pixel value of the defect candidate is a value out of range between a pixel value of the main reference image and a pixel value of the sub reference image.

5. The apparatus according to claim 1, further comprising:
   a difference image generation circuit configured to generate, for each pixel, a difference image defined by a difference value obtained by subtracting a value of the first design pattern image from a value of the second design pattern image, wherein
   the comparison circuit compares the main reference image with the measured image by using a first determination threshold, and
   the determination circuit determines, in a case where a pixel being the defect candidate is a pixel whose image remains in the difference image, whether the defect candidate is a defect by recomparing, with respect to the pixel being the defect candidate, the main reference image with the measured image by using a second determination threshold obtained by moderating the first determination threshold.

6. The apparatus according to claim 1, wherein the comparison circuit compares the main reference image with the measured image by using a first determination threshold, further comprising:
   a correction circuit configured to calculate a second determination threshold by correcting the first determination threshold by using a ratio obtained by dividing a difference value, which is calculated by subtracting a pattern dimension obtained using the first design pattern image from another pattern dimension obtained using the second design pattern image, by the pattern dimension obtained using the first design pattern image, wherein
   the determination circuit determines whether the defect candidate is a defect by recomparing, with respect to the pixel being the defect candidate, the main reference image with the measured image by using the second determination threshold.

7. The apparatus according to claim 1, wherein the measured image acquisition mechanism acquires, as the measured image, a secondary electron image obtained using a secondary electron including a reflected electron emitted from the inspection substrate irradiated with an electron beam.

8. The apparatus according to claim 1, wherein the measured image acquisition mechanism acquires, as the measured image, a secondary electron image obtained using a secondary electron including a reflected electron emitted from the inspection substrate irradiated with multi-beams of an electron beam.

9. The apparatus according to claim 1, wherein the measured image acquisition mechanism acquires, as the measured image, one of a transmission image obtained using a transmission light having passed through the inspection substrate, and a reflected image obtained using a reflection light reflected from the inspection substrate.

10. A pattern inspection method comprising:

acquiring a measured image of a pattern formed on an inspection substrate, by using one of an electron beam and a laser beam;

storing first design pattern data defining a first design pattern, and second design pattern data defining a second design pattern obtained by adding an auxiliary pattern for assisting the first design pattern to the first design pattern;

generating a first design pattern image which is defined by pixel data obtained by developing an image of the first design pattern;

generating a second design pattern image which is defined by pixel data obtained by developing an image of the second design pattern;

detecting a defect candidate by comparing, for each pixel, the measured image with a main reference image which is a predetermined one of the first design pattern image and the second design pattern image; and determining whether the defect candidate is a defect by using determination conditions obtained using, as a sub reference image, another predetermined one of the first design pattern image and the second design pattern image.

* * * * *